United States Patent
Fukumori et al.

(10) Patent No.: US 10,773,772 B2
(45) Date of Patent: Sep. 15, 2020

(54) BICYCLE SPROCKET ASSEMBLY

(71) Applicant: Shimano Inc., Sakai, Osaka (JP)

(72) Inventors: Tsuyoshi Fukumori, Osaka (JP); Hiroshi Fujita, Osaka (JP)

(73) Assignee: Shimano Inc., Osaka (JP)

( * ) Notice: Subject to any disclaimer, the term of this patent is extended or adjusted under 35 U.S.C. 154(b) by 289 days.

(21) Appl. No.: 15/485,970

(22) Filed: Apr. 12, 2017

(65) Prior Publication Data

US 2018/0297664 A1 Oct. 18, 2018

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC ................................. B62M 9/10; F16H 55/30
See application file for complete search history.

(56) References Cited

U.S. PATENT DOCUMENTS

| | | | | |
|---|---|---|---|---|
| 5,194,051 A | * | 3/1993 | Nagano | B62M 9/10 474/160 |
| 5,314,366 A | * | 5/1994 | Palm | B62M 9/105 474/152 |
| 8,100,795 B2 | * | 1/2012 | Reiter | B62M 9/10 474/160 |
| 8,911,314 B2 | * | 12/2014 | Braedt | B62M 9/10 474/160 |
| 9,511,819 B1 | * | 12/2016 | Watarai | F16H 55/30 |
| 9,550,547 B2 | * | 1/2017 | Valle | B62M 9/10 |
| 2007/0049436 A1 | | 3/2007 | Kamada | |
| 2008/0058144 A1 | * | 3/2008 | Oseto | B62M 9/10 474/160 |
| 2009/0042681 A1 | * | 2/2009 | Dal Pra' | B62M 9/10 474/160 |
| 2016/0347410 A1 | * | 12/2016 | Watarai | B62M 9/10 |
| 2018/0229801 A1 | * | 8/2018 | Nishimoto | F16H 55/30 |

* cited by examiner

*Primary Examiner* — Michael R Mansen
*Assistant Examiner* — Robert T Reese
(74) *Attorney, Agent, or Firm* — Global IP Counselors, LLP

(57) ABSTRACT

A bicycle sprocket assembly is basically provided that includes a sprocket support member, a first sprocket, a second sprocket that is a separate member from the first sprocket, and a third sprocket that is a separate member from the first and second sprockets. The sprocket support member is configured to support at least one of the first, second and third sprockets. The sprocket support member includes a plurality of sprocket support portions extending radially outwardly from a central cylindrical portion. A first reinforcement member is attached to at least one of the first and second sprockets, and extends between the first and second sprockets. A second reinforcement member is attached to at least one of the second and third sprockets, and extends between the second and third sprockets. Each of the first and second reinforcement members is disposed between an adjacent pair of the plurality of sprocket support portions.

36 Claims, 10 Drawing Sheets

BICYCLE SPROCKET ASSEMBLY

BACKGROUND

Field of the Invention

This invention generally relates to a bicycle sprocket assembly.

Background Information

Bicycling is becoming an increasingly more popular form of recreation, as well as a means of transportation. Moreover, bicycling has become a very popular competitive sport for both amateurs and professionals. Whether the bicycle is used for recreation, transportation or competition, the bicycle industry is constantly improving the various components of the bicycle. One area that has been extensively redesigned over the years is the bicycle drive train. Specifically, manufacturers of bicycle components have been continually improving shifting performance of the various shifting components, such as shifters, derailleurs, chain and sprockets.

One particular component of the bicycle drive train that has been extensively redesigned in the past years is the sprocket assembly.

SUMMARY

Generally, the present disclosure is directed to various features of a bicycle sprocket assembly.

In view of the state of the known technology and in accordance with a first aspect of the present disclosure, a bicycle sprocket assembly is basically provided that includes a first sprocket, a second sprocket, a third sprocket and a sprocket support member. The second sprocket is a separate member from the first sprocket. The third sprocket is a separate member from the first sprocket and the second sprocket. The sprocket support member is configured to support at least one of the first sprocket, the second sprocket and the third sprocket. The sprocket support member includes a central cylindrical portion, and a plurality of sprocket support portions extending radially outwardly from the central cylindrical portion with respect to a rotational center axis of the bicycle sprocket assembly. The plurality of sprocket support portions are spaced apart from each other in a circumferential direction about the rotational center axis. A first reinforcement member is attached to at least one of the first sprocket and the second sprocket and extends between the first sprocket and the second sprocket. A second reinforcement member is attached to at least one of the second sprocket and the third sprocket and extends between the second sprocket and the third sprocket. Each of the first and second reinforcement members is disposed between an adjacent pair of the plurality of sprocket support portions According to the first aspect of the present invention, a bicycle sprocket assembly is provided in which it is possible to reduce a total weight of the bicycle sprocket assembly while maintaining sufficient rigidity.

In accordance with a second aspect of the present invention, the bicycle sprocket assembly according to the first aspect is configured so that the first reinforcement member is attached to both of the first sprocket and the second sprocket. According to the second aspect of the present invention, a bicycle sprocket assembly is provided in which it is possible to maintain rigidity of the bicycle sprocket assembly.

In accordance with a third aspect of the present invention, the bicycle sprocket assembly according to the first or second aspect is configured so that the second reinforcement member is attached to both of the second sprocket and the third sprocket. According to the third aspect of the present invention, a bicycle sprocket assembly is provided in which it is possible to maintain rigidity of the bicycle sprocket assembly.

In accordance with a fourth aspect of the present invention, the bicycle sprocket assembly according to any one of the first to third aspects is configured so that the first and second reinforcement members are disposed between a first adjacent pair of the plurality of sprocket support portions. According to the fourth aspect of the present invention, a bicycle sprocket assembly is provided in which it is possible to maintain rigidity of the bicycle sprocket assembly.

In accordance with a fifth aspect of the present invention, the bicycle sprocket assembly according to any one of the first to third aspects is configured so that the first reinforcement member is disposed between a first adjacent pair of the plurality of sprocket support portions, and the second reinforcement member is disposed between a second adjacent pair of the plurality of sprocket support portions that is a different pair from the first adjacent pair of the sprocket support portions. According to the fifth aspect of the present invention, a bicycle sprocket assembly is provided in which it is possible to maintain rigidity of the bicycle sprocket assembly.

In accordance with a sixth aspect of the present invention, the bicycle sprocket assembly according to any one of the first to fifth aspects is configured such that the sprocket support member is configured to support the first sprocket, the second sprocket and the third sprocket. According to the sixth aspect of the present invention, a bicycle sprocket assembly is provided in which it is possible to reduce a total weight of the bicycle sprocket assembly.

In accordance with a seventh aspect of the present invention, the bicycle sprocket assembly according to any one of the first to sixth aspects is configured such that each of the plurality of sprocket support portions includes a plurality of radially extending surfaces extending radially relative to the rotational center axis to support at least the first sprocket, the second sprocket and the third sprocket and a plurality of axially extending surfaces extending in an axial direction parallel to the rotational center axis. According to the seventh aspect of the present invention, a bicycle sprocket assembly is provided in which it is possible to reduce a total weight of the bicycle sprocket assembly.

In accordance with an eighth aspect of the present invention, the bicycle sprocket assembly according to any the seventh aspect is configured such that the plurality of radially extending surfaces and the plurality of axially extending surfaces form a stepped shape. According to the eighth aspect of the present invention, a bicycle sprocket assembly is provided in which it is possible to reduce a total weight of the bicycle sprocket assembly.

In accordance with a ninth aspect of the present invention, the bicycle sprocket assembly according to any one of the first to eighth aspects is configured so that the central cylindrical portion includes a hub engagement profile to engage a bicycle hub assembly. According to the ninth aspect of the present invention, a bicycle sprocket assembly is provided in which it is possible to effectively transmit torque from the bicycle sprocket assembly to the bicycle hub assembly.

In accordance with a tenth aspect of the present invention, the bicycle sprocket assembly according to any one of the first to ninth aspects is configured so that the first reinforcement member includes a first mounting portion integrally formed as a one-piece member with one of the first sprocket and the second sprocket, and the second reinforcement member includes a second mounting portion integrally formed as a one-piece member with one of the second sprocket and the third sprocket. According to the tenth aspect of the present invention, a bicycle sprocket assembly is provided in which it is possible to maintain sufficient rigidity of the bicycle sprocket assembly.

In accordance with an eleventh aspect of the present invention, the bicycle sprocket assembly according to any one of the first to tenth aspects is configured such that the first and second reinforcement members are radially offset. According to the eleventh aspect of the present invention, a bicycle sprocket assembly is provided in which it is possible to reduce a total weight of the bicycle sprocket assembly while maintaining sufficient rigidity.

In accordance with a twelfth aspect of the present invention, the bicycle sprocket assembly according to the eleventh aspect is configured such that the second reinforcement member includes a plurality of second reinforcement members and the number of the first reinforcement member is less than the number of the plurality of second reinforcement members. According to the twelfth aspect of the present invention, a bicycle sprocket assembly is provided in which it is possible to maintain rigidity of the bicycle sprocket assembly.

In accordance with a thirteenth aspect of the present invention, a bicycle sprocket assembly is provided that basically comprises a first sprocket, a second sprocket and a sprocket support member. The second sprocket is a separate member from the first sprocket. The sprocket support member is configured to support the first sprocket and the second sprocket. The sprocket support member includes a central cylindrical portion and a plurality of sprocket support portions extending radially outwardly from the central cylindrical portion with respect to a rotational center axis of the bicycle sprocket assembly. The plurality of sprocket support portions are spaced apart from each other in a circumferential direction about the rotational center axis. A plurality of first reinforcement members are attached to at least one of the first sprocket and the second sprocket and extend between the first sprocket and the second sprocket. The plurality of first reinforcement members are disposed between a first adjacent pair of the plurality of sprocket support portions According to the thirteenth aspect of the present invention, a bicycle sprocket assembly is provided in which it is possible to provide a light-weight bicycle sprocket assembly while maintaining sufficient rigidity of the bicycle sprocket assembly.

In accordance with a fourteenth aspect of the present invention, the bicycle sprocket assembly according to the thirteenth aspect is configured such that the plurality of first reinforcement members are attached to both of the first sprocket and the second sprocket. According to the fourteenth aspect of the present invention, a bicycle sprocket assembly is provided in which it is possible to maintain rigidity of the bicycle sprocket assembly.

In accordance with a fifteenth aspect of the present invention, the bicycle sprocket assembly according to thirteenth or fourteenth aspect is configured such that the first adjacent pair of the plurality of sprocket support portions and the plurality of first reinforcement members are positioned at equal intervals in the circumferential direction. According to the fifteenth aspect of the present invention, a bicycle sprocket assembly is provided in which it is possible to maintain rigidity of the bicycle sprocket assembly.

In accordance with a sixteenth aspect of the present invention, the bicycle sprocket assembly according to any of the thirteenth to fifteenth aspects is configured to include a third sprocket that is a separate member from the first sprocket and the second sprocket, the first sprocket being larger than the second sprocket and the second sprocket being larger than the third sprocket, and at least one second reinforcement member attached to the second sprocket and the third sprocket between a second adjacent pair of the plurality of sprocket support portions. According to the sixteenth aspect of the present invention, a bicycle sprocket assembly is provided in which it is possible to provide a lightweight bicycle sprocket assembly.

In accordance with a seventeenth aspect of the present invention, the bicycle sprocket assembly according to the sixteenth aspect is configured such that the at least one second reinforcement member includes a plurality of second reinforcement members. According to the seventeenth aspect of the present invention, a bicycle sprocket assembly is provided in which it is possible to maintain rigidity of the bicycle sprocket assembly.

In accordance with an eighteenth aspect of the present invention, the bicycle sprocket assembly according to the sixteenth aspect is configured such that a number of the plurality of first reinforcement members is different from a number of the at least one second reinforcement members. According to the eighteenth aspect of the present invention, a bicycle sprocket assembly is provided in which it is possible to maintain rigidity of the bicycle sprocket assembly.

In accordance with an nineteenth aspect of the present invention, the bicycle sprocket assembly according to the sixteenth aspect is configured such that the number of the plurality of first reinforcement members is greater than the number of the at least one second reinforcement member. According to the nineteenth aspect of the present invention, a bicycle sprocket assembly is provided in which it is possible to maintain rigidity of the bicycle sprocket assembly.

In accordance with a twentieth aspect of the present invention, the bicycle sprocket assembly according to the eighteenth aspect is configured such that the at least one second reinforcement member includes a plurality of second reinforcement members and the number of the plurality of first reinforcement members is less than the number of the plurality of second reinforcement members. According to the twentieth aspect of the present invention, a bicycle sprocket assembly is provided in which it is possible to maintain rigidity of the bicycle sprocket assembly.

In accordance with a twenty-first aspect of the present invention, the bicycle sprocket assembly according to the sixteenth aspect is configured such that the first reinforcement member includes a first mounting portion integrally formed as a one-piece member with one of the first sprocket and the second sprocket, and the second reinforcement member includes a second mounting portion integrally formed as a one-piece member with one of the second sprocket and the third sprocket. According to the twenty-first aspect of the present invention, a bicycle sprocket assembly is provided in which it is possible to maintain rigidity of the bicycle sprocket assembly.

In accordance with a twenty-second aspect of the present invention, the bicycle sprocket assembly according to the sixteenth aspect is configured such that the plurality of first reinforcement members and the at least one second reinforcement member are radially offset. According to the twenty-second aspect of the present invention, a bicycle sprocket assembly is provided in which it is possible to maintain rigidity of the bicycle sprocket assembly.

In accordance with a twenty-third aspect of the present invention, a bicycle sprocket assembly is provided that basically comprises a first, sprocket, a second sprocket, a third sprocket, a fourth sprocket and a sprocket support member. The second sprocket is a separate member from the first sprocket. The third sprocket is a separate member from the first sprocket and the second sprocket. The fourth sprocket is a separate member from the first sprocket, the second sprocket and the third sprocket. The sprocket support member is configured to support at least one of the first sprocket, the second sprocket, the third sprocket and the fourth sprocket. The sprocket support member includes a central cylindrical portion and a plurality of sprocket support portions extending radially outwardly from the central cylindrical portion with respect to a rotational center axis of the bicycle sprocket assembly. The plurality of sprocket support portions are spaced apart from each other in a circumferential direction about the rotational center axis. A first reinforcement member is attached to at least one of the first sprocket and the second sprocket and extends between the first sprocket and the second sprocket. A third reinforcement member is attached to at least one of the third sprocket and the fourth sprocket and extends between the third sprocket and the fourth sprocket. Each of the first and third reinforcement members is disposed between an adjacent pair of the plurality of sprocket support portions. According to the twenty-third aspect of the present invention, a bicycle sprocket assembly is provided in which it is possible to provide a light-weight bicycle sprocket assembly while maintaining sufficient rigidity of the bicycle sprocket assembly.

In accordance with a twenty-fourth aspect of the present invention, the bicycle sprocket assembly according to the twenty-third aspect is configured such that the first reinforcement member is attached to both of the first sprocket and the second sprocket. According to the twenty-fourth aspect of the present invention, a bicycle sprocket assembly is provided in which it is possible to maintain rigidity of the bicycle sprocket assembly.

In accordance with a twenty-fifth aspect of the present invention, the bicycle sprocket assembly according to the twenty-fourth aspect is configured such that the third reinforcement member is attached to both of the third sprocket and the fourth sprocket. According to the twenty-fifth aspect of the present invention, a bicycle sprocket assembly is provided in which it is possible to maintain rigidity of the bicycle sprocket assembly.

In accordance with a twenty-sixth aspect of the present invention, the bicycle sprocket assembly according to any one of the twenty-third to twenty-fifth aspects is configured such that the first and third reinforcement members are disposed between a first adjacent pair of the plurality of sprocket support portions. According to the twenty-sixth aspect of the present invention, a bicycle sprocket assembly is provided it is possible to maintain rigidity of the bicycle sprocket assembly.

In accordance with a twenty-seventh aspect of the present invention, the bicycle sprocket assembly according to any one of the twenty-third to twenty-fifth aspects is configured such that the first reinforcement member is disposed between a first adjacent pair of the plurality of sprocket support portions, and the third reinforcement member is disposed between a third adjacent pair of the plurality of sprocket support portions that is a different pair from the first adjacent pair of the sprocket support portions. According to the twenty-seventh aspect of the present invention, a bicycle sprocket assembly is provided in which it is possible to maintain rigidity of the bicycle sprocket assembly.

In accordance with a twenty-eighth aspect of the present invention, the bicycle sprocket assembly according to any one of the twenty-third to twenty-seventh aspects is configured such that the first sprocket is larger than the second sprocket, the second sprocket is larger than the third sprocket and the third sprocket is larger than the fourth sprocket. According to the twenty-eighth aspect of the present invention, a bicycle sprocket assembly is provided in which it is possible to reduce the total weight of the bicycle sprocket assembly.

In accordance with a twenty-ninth aspect of the present invention, the bicycle sprocket assembly according to any one of the twenty-third to twenty-eighth aspects is configured such that the first reinforcement member includes a first mounting portion integrally formed as a one-piece member with one of the first sprocket and the second sprocket, and the third reinforcement member includes a third mounting portion integrally formed as a one-piece member with one of the third sprocket and the fourth sprocket. According to the twenty-ninth aspect of the present invention, a bicycle sprocket assembly is provided in which it is possible to maintain rigidity of the bicycle sprocket assembly.

In accordance with a thirtieth aspect of the present invention, the bicycle sprocket assembly according to any one of the twenty-third to twenty-sixth aspects is configured such that the first and third reinforcement members are radially offset. According to the thirtieth aspect of the present invention, a bicycle sprocket assembly is provided in which it is possible to maintain rigidity of the bicycle sprocket assembly.

In accordance with a thirty-first aspect of the present invention, a bicycle sprocket assembly is provided that basically comprises a largest sprocket, a smallest sprocket, at least one intermediate sprocket and a sprocket support member. The at least one intermediate sprocket is disposed between the largest sprocket and the smallest sprocket in an axial direction parallel to a rotational center axis of the bicycle sprocket assembly. The sprocket support member is configured to support at least one of the largest sprocket, the smallest sprocket and the at least one intermediate sprocket. The sprocket support member includes a central cylindrical portion and a plurality of sprocket support portions extending radially outwardly from the central cylindrical portion with respect to a rotational center axis. The plurality of sprocket support portions are spaced apart from each other in a circumferential direction about the rotational center axis. A plurality of reinforcement member is attached to each of the largest sprocket, the smallest sprocket and the at least one intermediate sprocket between an adjacent pair of the plurality of sprocket support portions. According to the thirty-first aspect of the present invention, a bicycle sprocket assembly is provided in which it is possible to provide a light-weight bicycle sprocket assembly while maintaining sufficient rigidity of the bicycle sprocket assembly.

In accordance with a thirty-second aspect of the present invention, the bicycle sprocket assembly according to the thirty-first aspect is configured such that the at least one intermediate sprocket includes a plurality of intermediate sprockets. According to the thirty-second aspect of the present invention, a bicycle sprocket assembly is provided in which it is possible to provide a lightweight bicycle sprocket assembly.

In accordance with a thirty-third aspect of the present invention, the bicycle sprocket assembly according to the thirty-first aspect is configured such that each of the plurality of reinforcement members attached to a larger sprocket including the largest sprocket and the at least one intermediate sprocket and to a smaller sprocket including the smallest sprocket and the at least one intermediate sprocket includes a mounting portion integrally formed as a one-piece member with one of the larger sprocket and the smaller sprocket to which each of the plurality of reinforcement members is respectively attached. According to the thirty-third aspect of the present invention, a bicycle sprocket assembly is provided in which it is possible to maintain rigidity of the bicycle sprocket assembly.

Also other objects, features, aspects and advantages of the disclosed bicycle sprocket assembly will become apparent to those skilled in the art from the following detailed description, which, taken in conjunction with the annexed drawings, discloses exemplary embodiments of the bicycle sprocket assembly.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
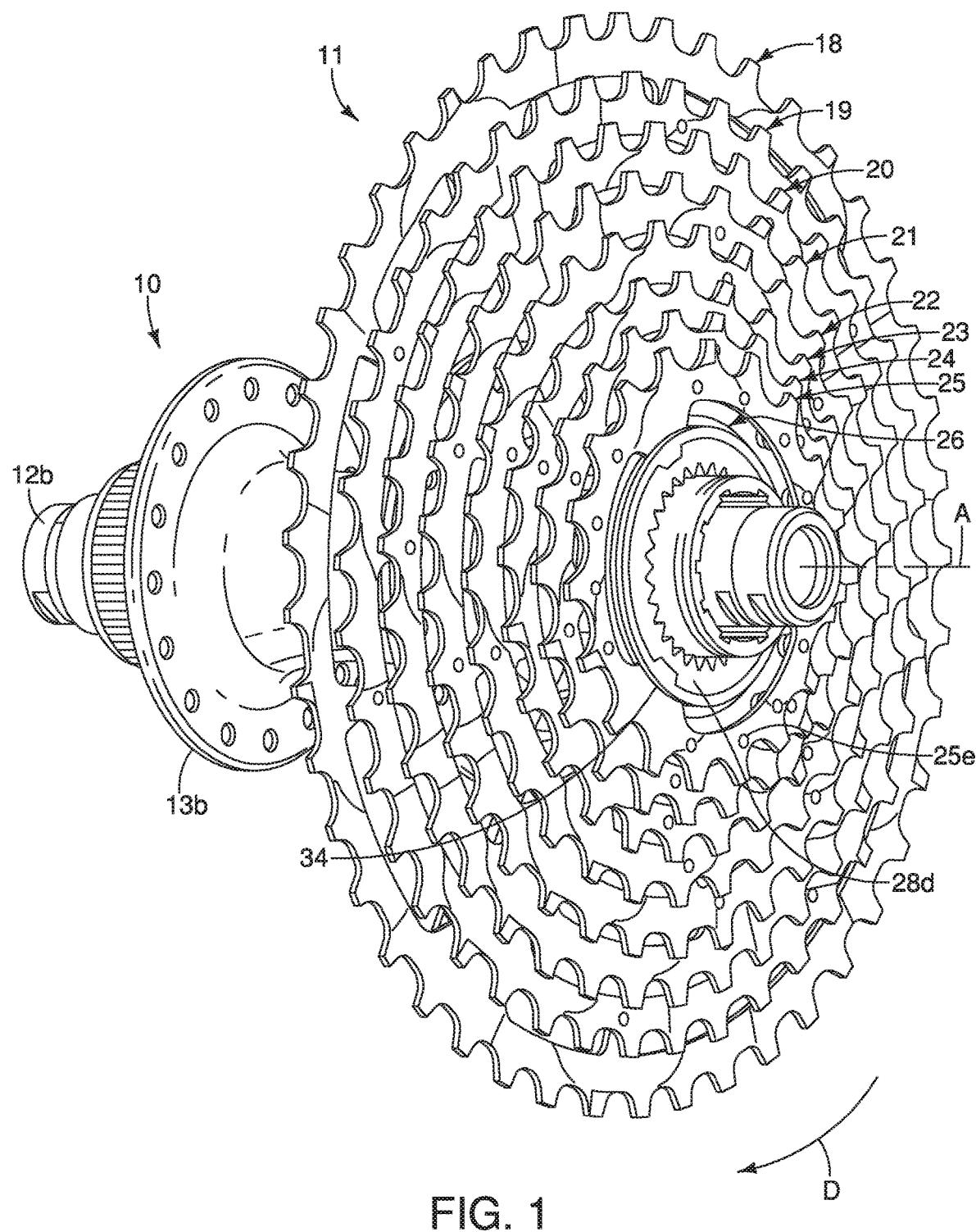
FIG. 1 is a perspective view of a bicycle rear sprocket assembly mounted to a bicycle rear hub assembly in accordance with one illustrated embodiment.

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a bicycle rear sprocket assembly in accordance with the exemplary embodiments of the present invention can have a different number of sprockets.

Referring initially to FIGS. 1 to 4, a bicycle rear hub assembly 10 is illustrated to which a bicycle rear sprocket assembly 11 in accordance with a first exemplary embodiment is mounted. The bicycle rear hub assembly 10 basically comprises a hub axle 12 and a hub shell 13. The hub axle 12 is a conventional member having a shaft portion 12a with a first end cap 12b connected to a first end of the hub axle 12 and a second end cap 12c connected to a second end of the hub axle 12. The hub axle 12 defines a rotational center axis A. The hub shell 13 is rotatably mounted on the hub axle 12 to rotate around the rotational center axis A. The hub shell 13 has a center tubular body 13a and a pair of spoke attachment flanges 13b and 13c extending outwardly in a radial direction from the center tubular body 13a.

Figure 3:
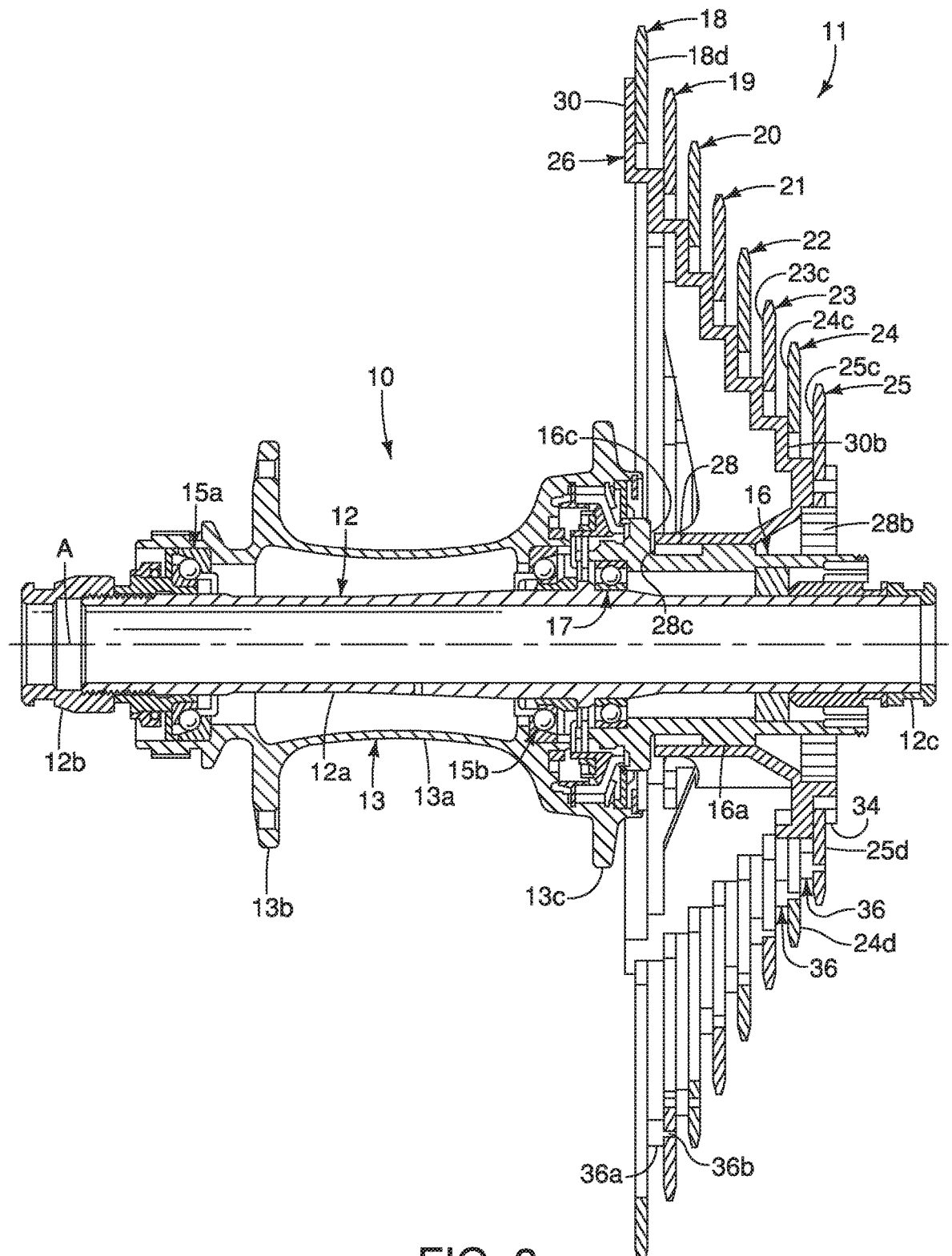
FIG. 3 is a rear elevational view in cross section of the rear hub assembly and the rear sprocket assembly of FIG. 2.

As shown in FIG. 3, at least one bearing assembly is provided for rotatably supporting the hub shell 13 on the hub axle 12. In the illustrated exemplary embodiment, the hub shell 13 is rotatably mounted on the hub axle 12 by a pair of bearing assemblies 15a and 15b. The bearing assemblies 15a and 15b are conventional parts that are well known in the bicycle field, and thus, the bearing assemblies 15a and 15b will not be discussed any or illustrated in detail herein. Also, other bearing arrangements can be used as needed and/or desired.

Referring now to FIG. 3, the bicycle rear hub assembly 10 further comprises a sprocket support body 16. At least one bearing assembly 17 is provided for rotatably supporting the sprocket support body 16 on the hub axle 12. In the illustrated exemplary embodiment, the sprocket support body 16 is rotatably mounted on the hub axle 12 by the bearing assembly 17, although any suitable number of bearing assemblies can be used. Coasting or freewheeling occurs when the sprocket support body 16 stops rotating or moves in a non-driving rotational direction (i.e., counterclockwise about the rotational center axis A as viewed from the sprocket support body side of the bicycle rear hub assembly 10) while the hub shell 13 rotates in a driving rotational direction (i.e., clockwise about the rotational center axis A as viewed from the sprocket support body side of the bicycle rear hub assembly 10).

Figure 2:
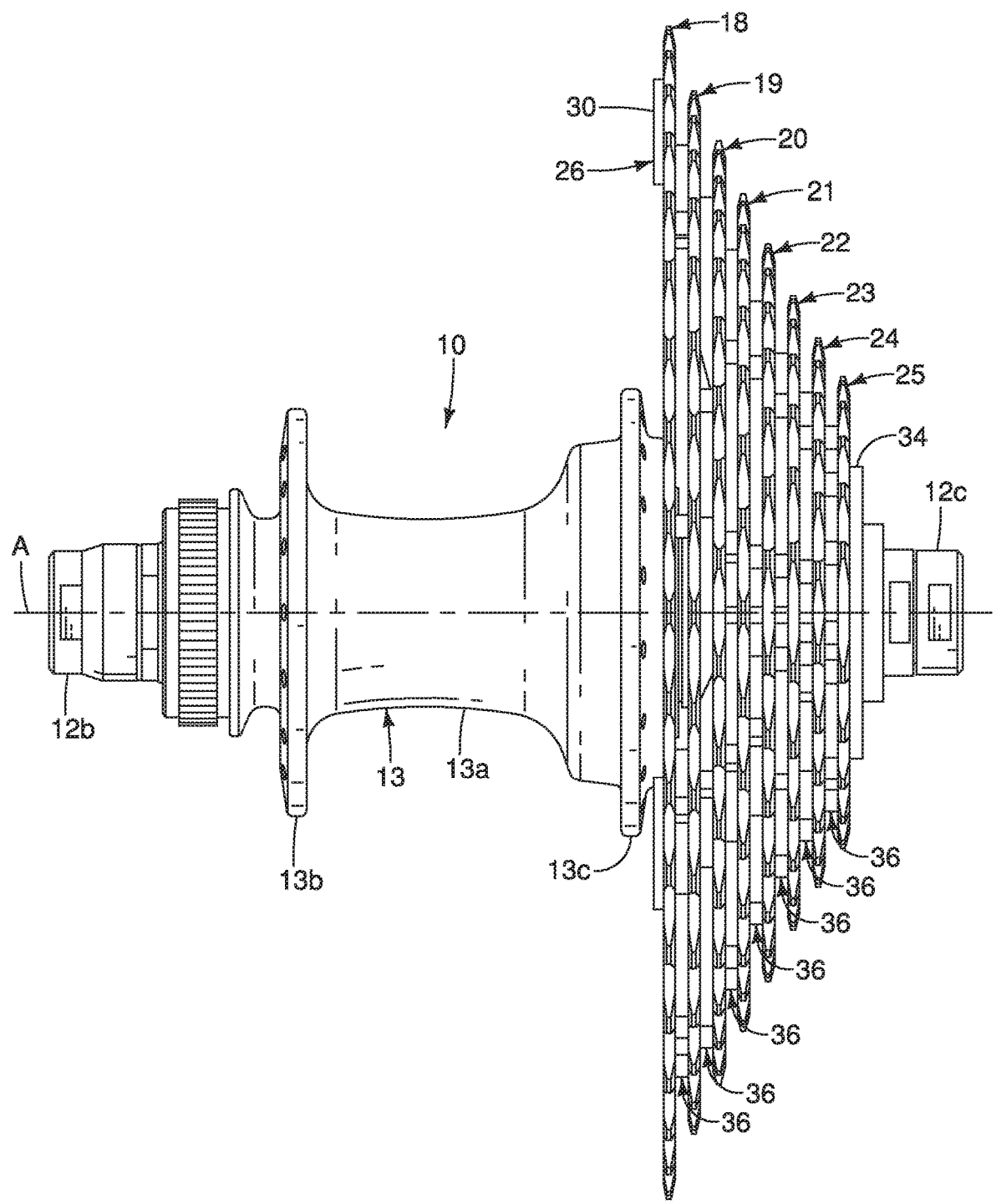
FIG. 2 is a rear elevational view of the rear hub assembly and the rear sprocket assembly of FIG. 1.

Referring to FIGS. 1 to 9, a bicycle rear sprocket assembly 11 is illustrated in accordance with a first exemplary embodiment of the present invention. The bicycle rear sprocket assembly 11 includes eight sprockets 18 to 25. The sprockets 18 to 25 are axially spaced from each other at predetermined intervals. The sprockets 18 to 25 are configured to be fixedly mounted on the bicycle rear hub assembly 10, as shown in FIGS. 1 to 3, such that the sprockets 18 to 25 are configured to rotate together about the rotational center axis A. The sprockets 18 to 25 typically rotate together in a forward rotational direction D (e.g., in a clockwise direction as viewed in FIG. 1) when the rider is pedaling in a forward (clockwise) direction to propel the bicycle in a forward direction. It will be apparent to those skilled in the bicycle art from this disclosure that the bicycle rear sprocket assembly can have fewer or more sprockets.

The bicycle sprocket assembly 11 includes at least a first sprocket, such as sprocket 18, and a second sprocket, such as sprocket 19, that is a separate member from the first sprocket. The bicycle sprocket assembly 11 can further include a third sprocket, such as sprocket 20, that is a separate member from the first sprocket and the second sprocket. The bicycle sprocket assembly 11 can still further include a fourth sprocket, such as sprocket 21, that is a separate member from the first sprocket, the second sprocket and the third sprocket. As shown in FIG. 2, the first sprocket 18 is larger than the second sprocket 19 and the second sprocket 19 is larger than the third sprocket 20, and the third sprocket 20 is larger than the fourth sprocket 21.

In other words, referring to FIG. 1, the bicycle sprocket assembly 11 includes a largest sprocket 18 and a smallest sprocket 25 and at least one intermediate sprocket, such as sprocket 20, disposed between the largest sprocket 18 and the smallest sprocket 25 in an axial direction parallel to the rotational center axis A of the bicycle sprocket assembly 11. As shown in FIGS. 2 and 3, the at least one intermediate sprocket includes a plurality of intermediate sprockets, such as sprockets 19 to 24.

As shown in FIGS. 1 to 11, the sprockets 18 to 25 are hard, rigid disc shaped members formed from a suitable material, such as a metallic material. In the illustrated exemplary embodiment, the sprockets 18 to 25 are each a one-piece, unitary member formed of a metallic material that is suitable for a bicycle sprocket. The sprockets 18 to 25 can include modified teeth, such as teeth having inclined surfaces, and/or recesses to facilitate downshifting and upshifting operations.

As shown in FIGS. 3 and 6 to 9, the bicycle sprocket assembly 11 includes a sprocket support member 26 configured to support at least one of the plurality of sprockets 18 to 25. For example, the sprocket support member 26 is configured to support at least one of the first sprocket, the second sprocket, the third sprocket and the fourth sprocket. Referring to FIG. 3, the sprocket support member 26 is configured to support the first sprocket 18, the second sprocket 19 and the third sprocket 20.

The sprocket support member 26 is configured to support at least one of the largest sprocket (i.e., the first sprocket 18), the smallest sprocket (i.e., the eighth sprocket 25) and the intermediate sprocket (e.g., the third sprocket 20) disposed between the largest and smallest sprockets. As shown in FIG. 3, the sprocket support member 26 supports the sprockets 18 to 25.

Figure 8:
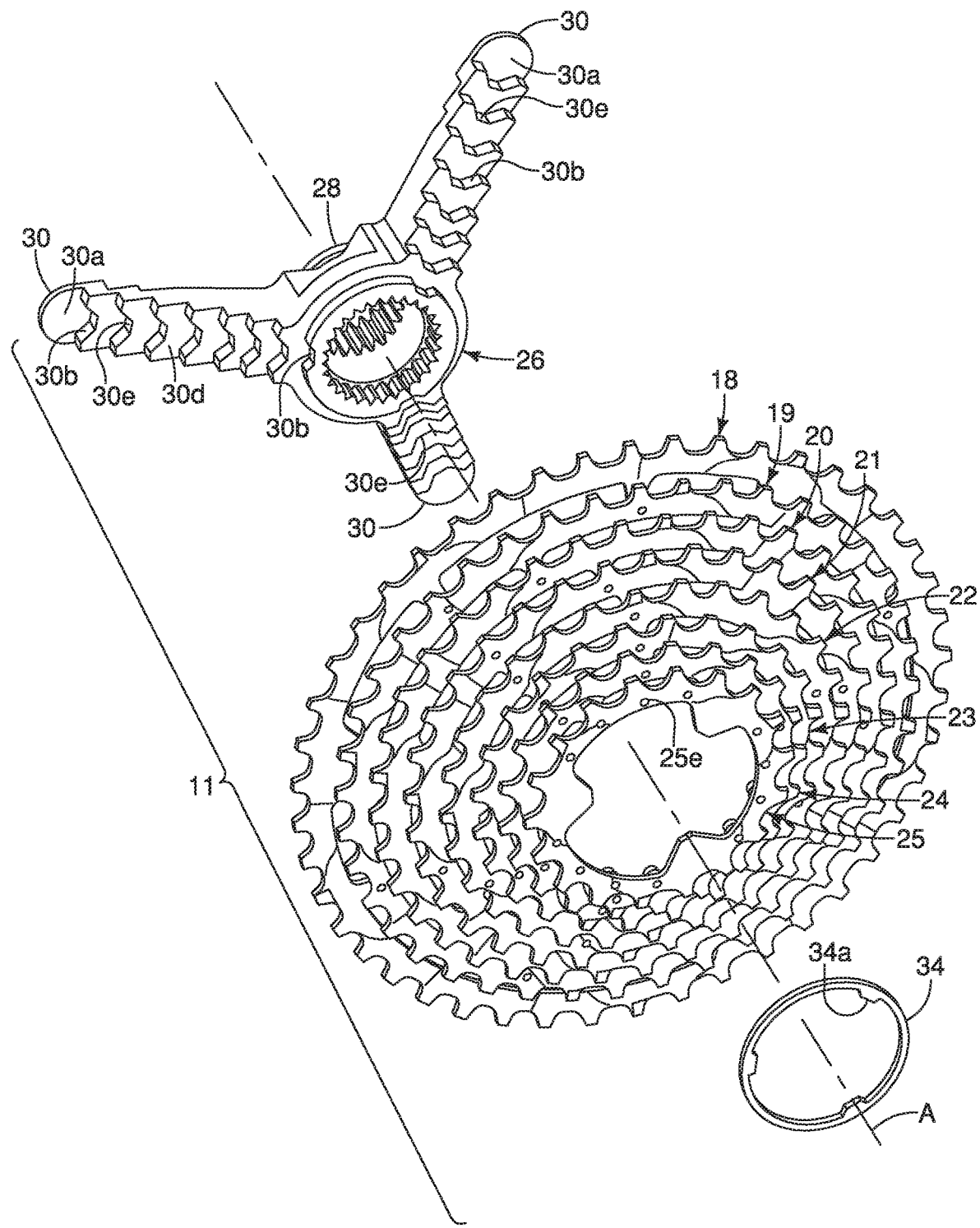
FIG. 8 is an exploded front perspective view of the bicycle rear sprocket of FIG. 5.
Figure 9:
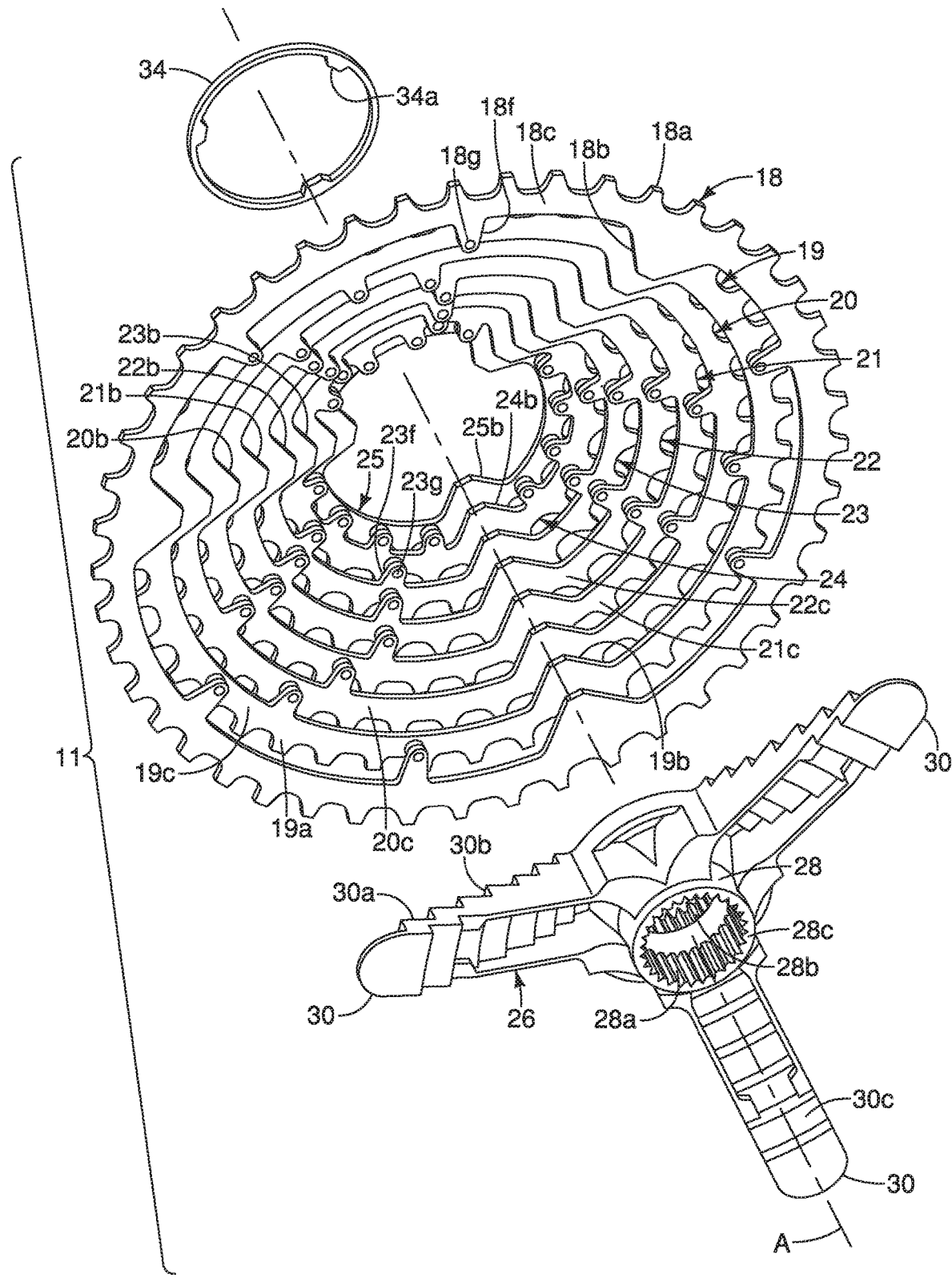
FIG. 9 is an exploded rear perspective view of the bicycle rear sprocket assembly of FIG. 5.

The sprocket support member 26 includes a central cylindrical portion 28 and a plurality of sprocket support portions 30 extending radially outwardly from the central cylindrical portion 28 with respect to the rotational center axis A of the bicycle sprocket assembly 11. The plurality of sprocket support portions 30 are spaced apart from each other in a circumferential direction about the rotational center axis A, as shown in FIGS. 8 and 9. As shown in FIGS. 8 and 9, the sprocket support member 26 has three sprocket support portions 30, although the sprocket support member can have any suitable number of sprocket support portions 30.

Figure 4:
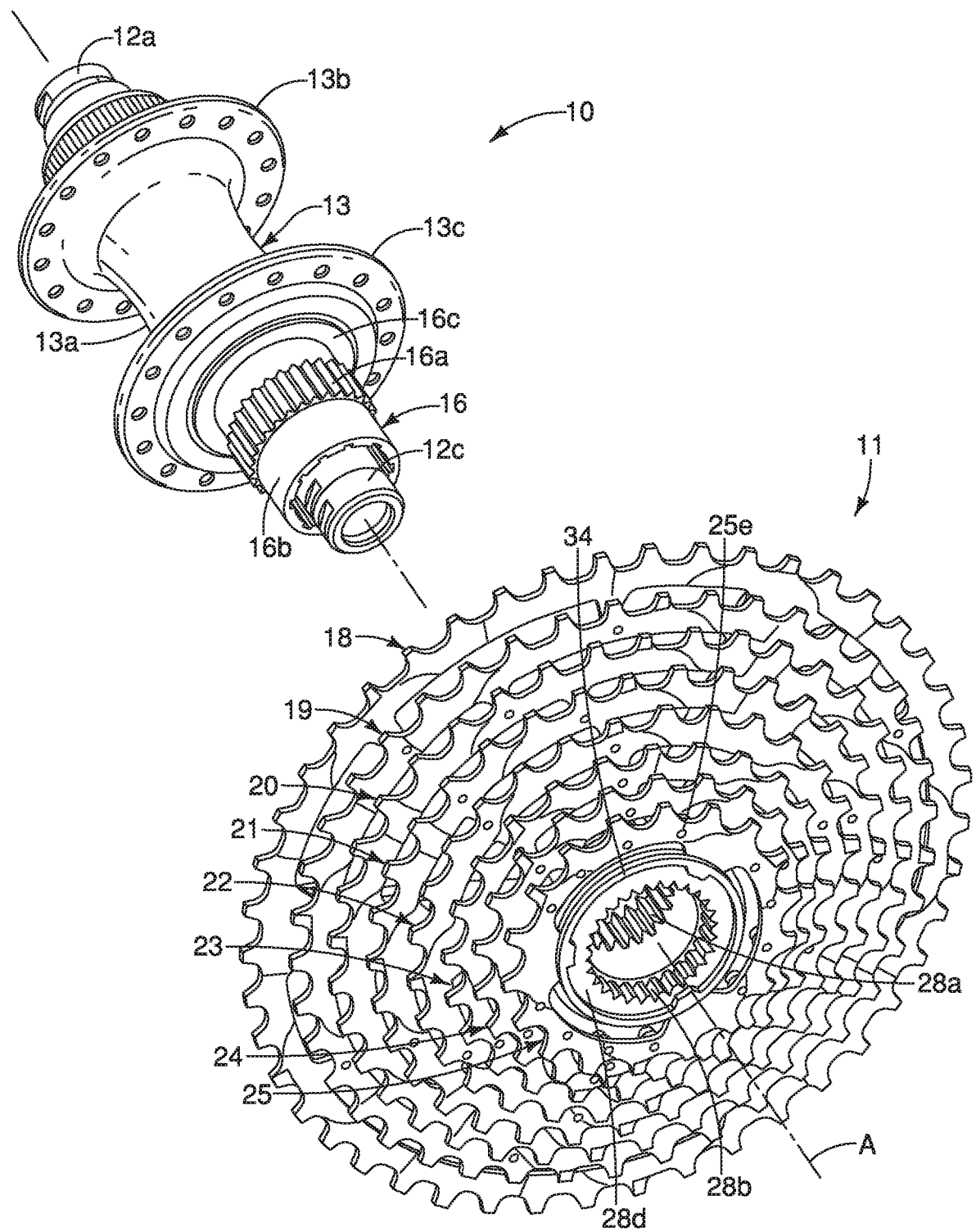
FIG. 4 is an exploded perspective view of the rear hub assembly and the rear sprocket assembly of FIG. 1.

The central cylindrical portion 28 includes a hub engagement profile 28a configured to engage the bicycle hub assembly 10 and a sprocket engagement profile 28b configured to engage an additional sprocket member. The hub engagement profile 28a is formed on a radially inner peripheral surface of the central cylindrical portion 28. A first abutment surface 28c extends radially outwardly with respect to the rotational center axis A. The hub engagement profile 28a facilitates the transfer of torque from the bicycle rear sprocket assembly 11 to the bicycle rear hub assembly 10. Preferably, the hub engagement profile 28a formed on the radially inner peripheral surface of the central cylindrical portion 28 includes a plurality of splines configured to engage a corresponding splined portion 16a of the bicycle rear hub assembly 10, as shown in FIGS. 3 and 4. As shown in FIG. 4, the splined portion 16a extends axially along an outer surface 16b of the sprocket support body 16. Accordingly, torque is transmitted from the bicycle rear sprocket assembly 11 to the bicycle rear hub assembly 10 through the splined connection between the central cylindrical portion 28 and the sprocket support body 16. The first abutment surface 28c abuts an abutment member 16c of the bicycle rear hub assembly 10 when the central cylindrical portion 28 is engaged with the splined portion 16a of the bicycle rear hub assembly 10, as shown in FIG. 3.

Figure 5:
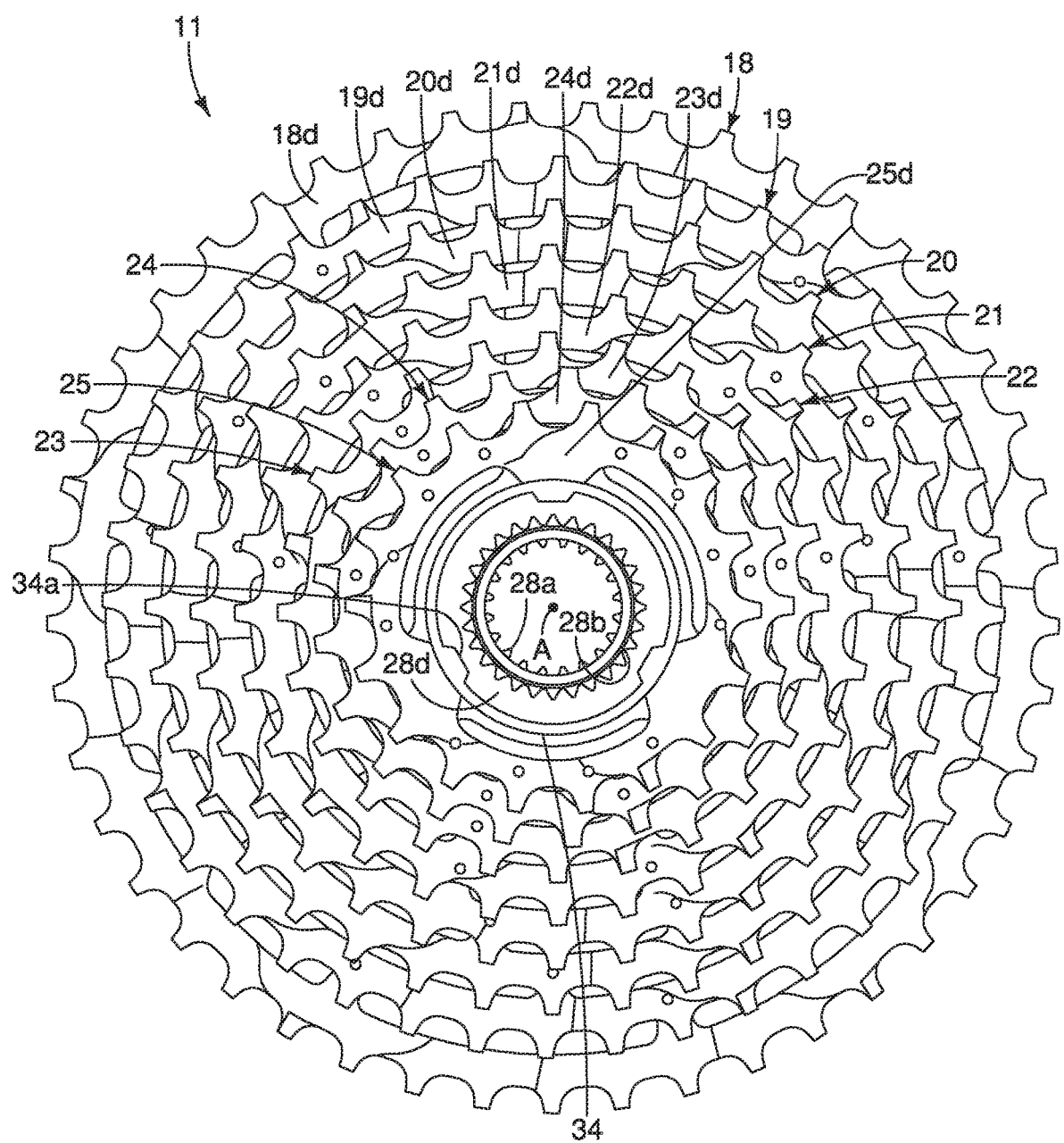
FIG. 5 is an outside elevational view of the bicycle rear sprocket assembly of FIG. 1.
Figure 7:
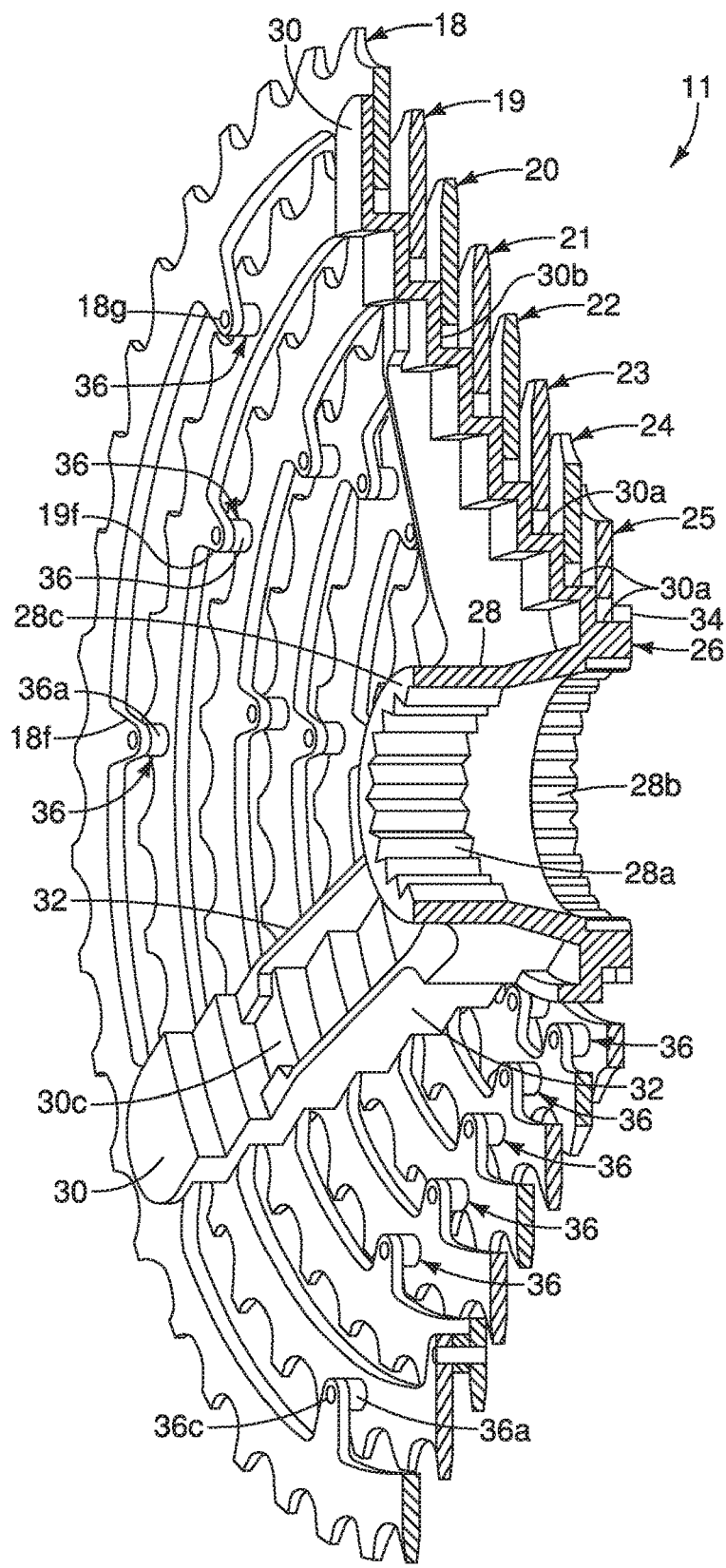
FIG. 7 is a partial rear perspective view in cross section of the bicycle rear sprocket assembly of FIG. 5.

The sprocket engagement profile 28b is formed on a radially inner peripheral surface of the central cylindrical portion 28. A second abutment surface 28d extends radially outwardly with respect to the rotational center axis A. As shown in FIGS. 5 and 7, the hub engagement profile 28a has a smaller diameter than the sprocket engagement profile 28b. The sprocket engagement profile 28b is configured to engage an additional sprocket member (not shown). The additional sprocket member has at least one sprocket to increase the number of sprockets of the bicycle sprocket assembly 11. The additional sprocket member has a splined portion disposed on an outer surface thereof to engage the sprocket engagement profile 28b. The second abutment surface 28d engages the additional sprocket member to properly position the additional sprocket member. Torque is transmitted from the additional sprocket member to the bicycle hub assembly 11 through the sprocket engagement profile 28b, and from the bicycle hub assembly 11 to the bicycle rear hub assembly 10 through the splined connection between the center cylindrical portion 28 and the sprocket support body 16.

Each of the sprocket support portions 30 has a plurality of radially extending surfaces 30a extending radially relative to the rotational center axis A to support at least one sprocket, and a plurality of axially extending surfaces 30b extending in an axial direction parallel to the rotational center axis A, as shown in FIGS. 8 and 9. Preferably, the plurality of radially extending surfaces 30a support at least the first sprocket 18, the second sprocket 19 and the third sprocket 20. More preferably, each of the radially extending surfaces 30a supports one of the sprockets 18 to 25. The plurality of radially extending surfaces 30a and the plurality of axially extending surfaces 30b are alternately arranged to form a stepped shape configured to support the plurality of bicycle sprockets, as shown in FIGS. 3 and 7.

Figure 6:
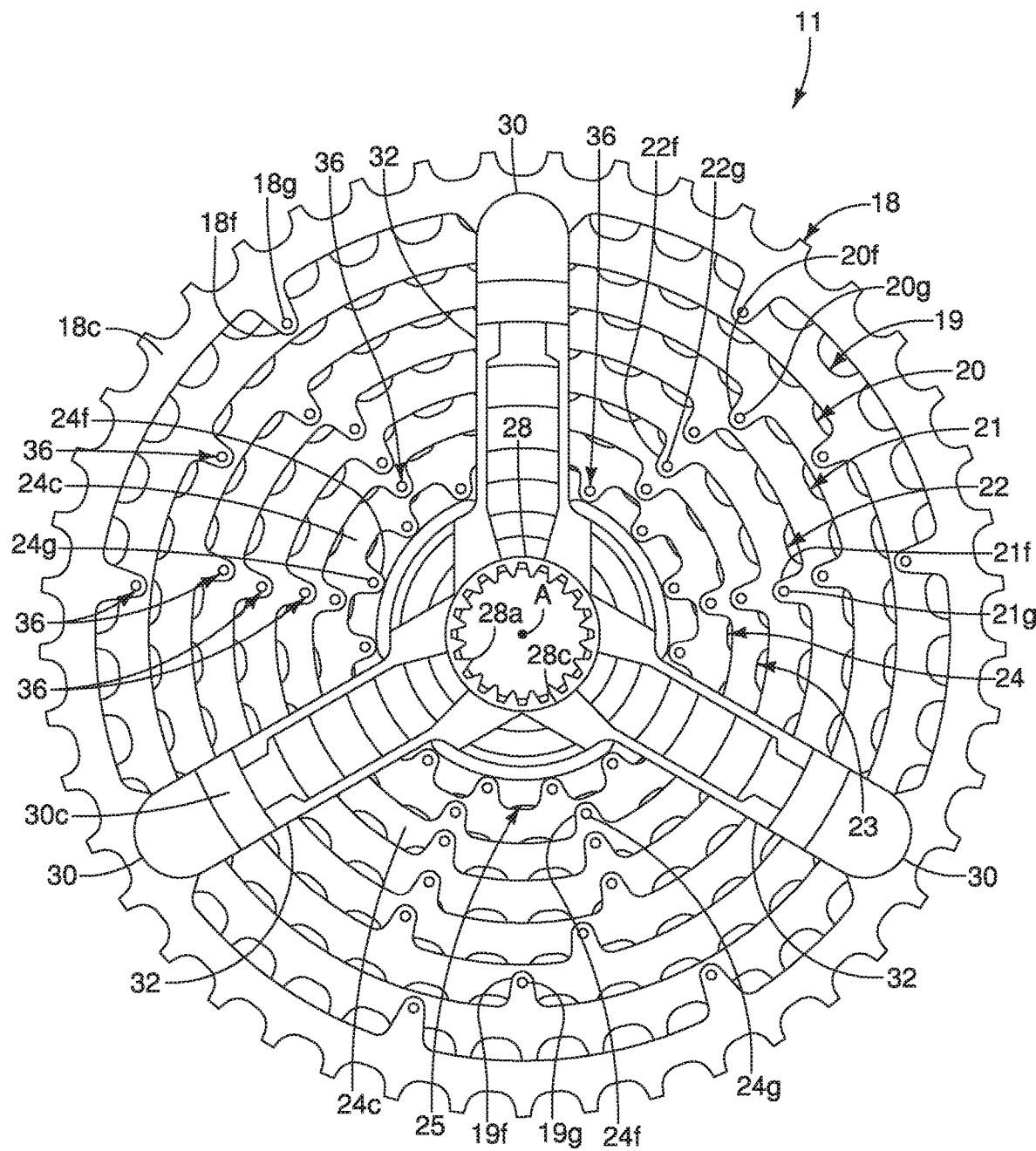
FIG. 6 is an inbound elevational view of bicycle rear sprocket assembly of FIG. 5.

As shown in FIGS. 6 to 9, each of the plurality of sprocket support portions 30 has a radially inner peripheral surface 30c and a radially outer peripheral surface 30d. As shown in FIGS. 6 and 7, at least one reinforcement portion 32 is provided to the radially inner peripheral surface 30c to enhance the rigidity of the sprocket support member 26. Preferably, at least one reinforcement portion 32 is provided to each of the radially inner peripheral surfaces 30c of each of the sprocket support portions 30. Preferably, each sprocket supporting portion 30 has a pair of reinforcement portions 32 disposed on opposite sides of the radially inner peripheral surface 30c. The reinforcement portion 32 extends radially outwardly from the center cylindrical portion 28. The reinforcement portion 32 extends less than an entire length of the sprocket support portion 30, as shown in FIGS. 6 and 7. Alternatively, the reinforcement portion 32 extends the entire length of the sprocket support portion 30. The radially outer peripheral surface 30d is configured to support at least one bicycle sprocket.

The sprocket support member 26 is made of any suitable material. For example, the sprocket support member is made of a metallic material, such as a metallic material that includes aluminum alloy. Alternatively, the sprocket support member 26 is made of a non-metallic material, such as a non-metallic material that includes fiber reinforced plastic.

Figure 10:
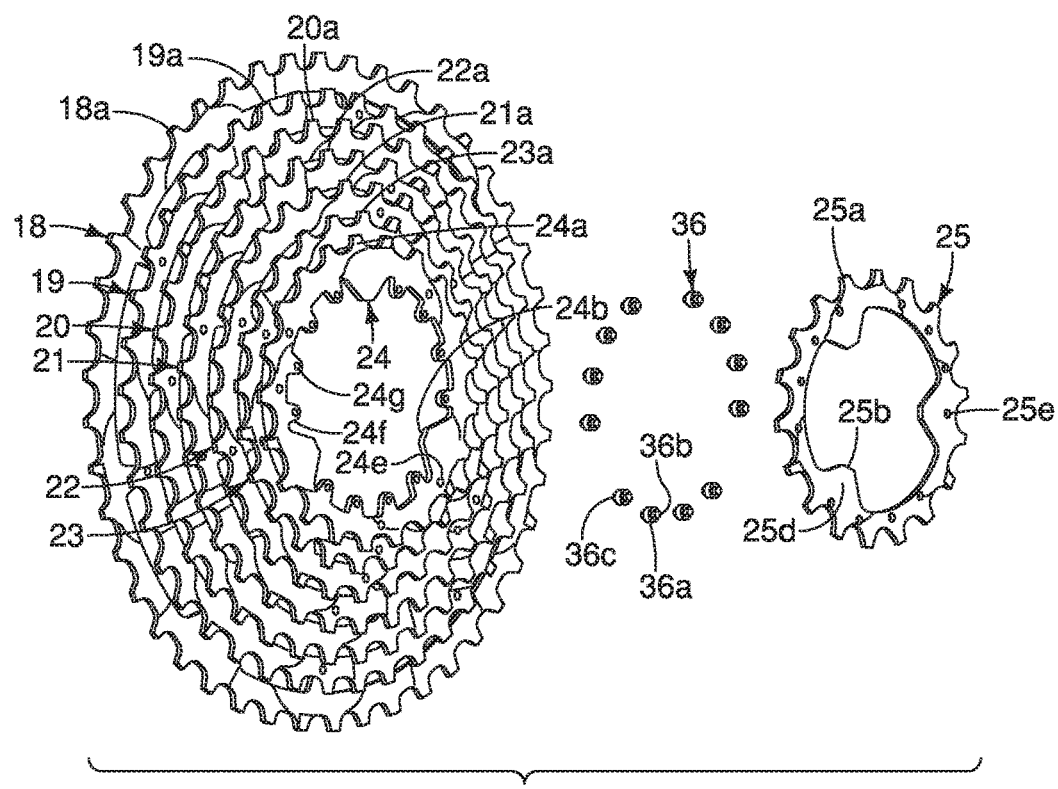
FIG. 10 is an exploded sprocket assembly in which a first sprocket is separated from a second sprocket.

Referring now to FIGS. 3 and 10, the eighth, or smallest, sprocket 25 basically has a sprocket body and a plurality of sprocket teeth 25a provided to an outer periphery of the sprocket body. The plurality of teeth 25a are circumferentially spaced and extend radially and outwardly from the outer periphery of the sprocket body. A plurality of sprocket attachment portions 25b are circumferentially spaced and extend radially inwardly from an inner periphery of the sprocket body. The plurality of sprocket attachment portions 25b are configured to be mounted on the sprocket support member 26. The sprocket body has a first axial side or large sprocket side 25c that faces the spoke attachment flange 13c (i.e., an inbound direction toward the small sprocket side 24d of the seventh sprocket 24) and a second axial side or small sprocket side 25d that faces an outbound direction (i.e., away from the spoke attachment flange 13c). A plurality of first fastener openings 25e are disposed in the sprocket body and spaced in a circumferential direction about the rotational center axis A. Preferably, there are twelve first fastener openings 25e disposed in the sprocket body.

Figure 11:
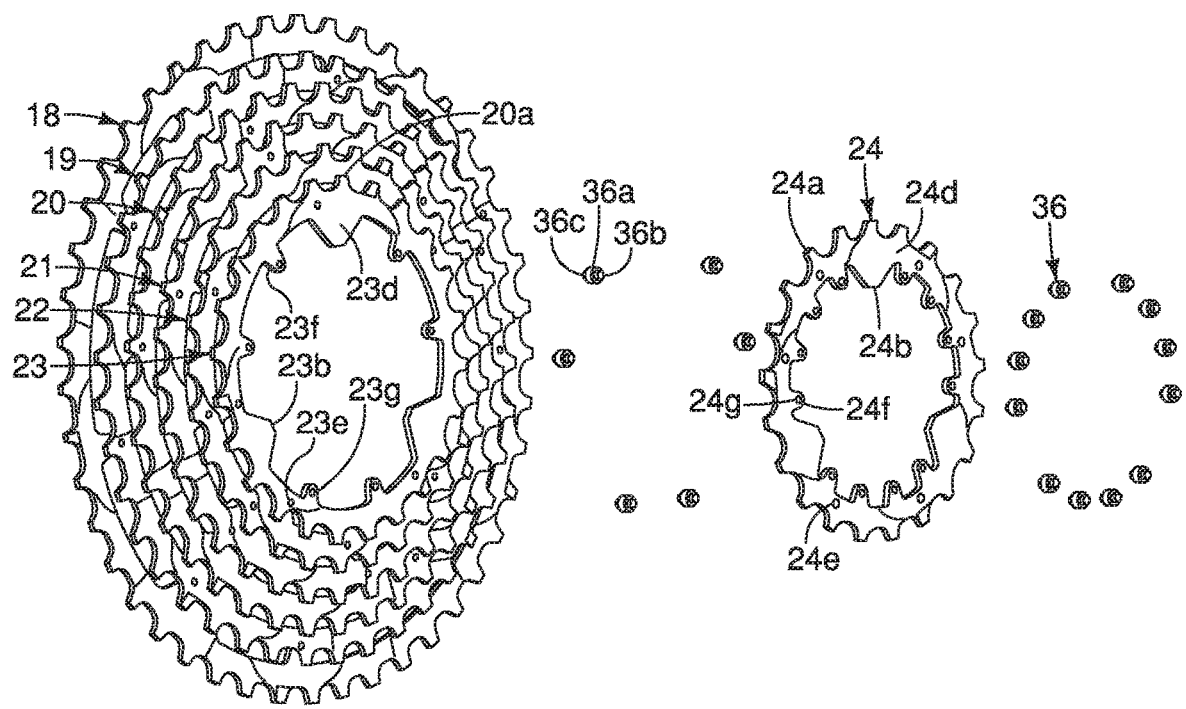
FIG. 11 is an exploded sprocket assembly in which a second sprocket is separated from a third sprocket.

Referring now to FIGS. 3, 5, 6, 9, 10 and 11, the seventh sprocket 24 basically has a sprocket body and a plurality of sprocket teeth 24a provided to an outer periphery of the sprocket body. The plurality of teeth 24a are circumferentially spaced and extend radially and outwardly from the outer periphery of the sprocket body. A plurality of sprocket attachment portions 24b are circumferentially spaced and extend radially and inwardly from an inner periphery of the sprocket body. The plurality of sprocket attachment portions 24b are configured to be mounted on the sprocket support member 26. The sprocket body has a first axial side or large sprocket side 24c that faces the spoke attachment flange 13c (i.e., an inbound direction toward the small sprocket side 23d of the sixth sprocket 23) and a second axial side or small sprocket side 24d that faces an outbound direction (toward the large sprocket side 25c of the eighth sprocket 25). A plurality of first fastener openings 24e are circumferentially spaced about the sprocket body. Preferably, six first fastener openings 24e are disposed in the sprocket body. A plurality of sprocket mounting portions 24f are circumferentially spaced and extend radially and inwardly from the inner periphery of the sprocket body. A second fastener opening 24g is disposed in each of the sprocket mounting portions 24f. As shown in FIG. 11, the seventh sprocket 24 has three sprocket attachment portions 24b and twelve sprocket mounting portions 24f. Preferably, four sprocket mounting portions 24f are disposed between each adjacent pair of the sprocket attachment portions 24b.

Referring now to FIGS. 3, 5, 6, 9, 10 and 11, the sixth sprocket 23 basically has a sprocket body and a plurality of sprocket teeth 23a provided to an outer periphery of the sprocket body. The plurality of teeth 23a are circumferentially spaced and extend radially and outwardly from the outer periphery of the sprocket body. A plurality of sprocket attachment portions 23b are circumferentially spaced and extend radially and inwardly from an inner periphery of the sprocket body. The plurality of sprocket attachment portions 23b are configured to be mounted on the sprocket support member 26. The sprocket body has a first axial side or large sprocket side 23c that faces the spoke attachment flange 13c (i.e., an inbound direction toward the small sprocket side 22d of the fifth sprocket 22) and a second axial side or small sprocket side 23d that faces an outbound direction (toward the large sprocket side 24c of the seventh sprocket 24). A plurality of first fastener openings 23e are circumferentially spaced about the sprocket body. Preferably, six first fastener openings 23e are disposed in the sprocket body. A plurality of sprocket mounting portions 23f are circumferentially spaced and extend radially and inwardly from the inner periphery of the sprocket body. A second fastener opening 23g is disposed in each of the sprocket mounting portions 23f. As shown in FIGS. 9 and 11, the sixth sprocket 23 has three sprocket attachment portions 23b and six sprocket mounting portions 23f. Preferably, two sprocket mounting portions 23f are disposed between each adjacent pair of the sprocket attachment portions 23b.

Referring now to FIGS. 3, 5, 6, 9, 10 and 11, the fifth sprocket 22 basically has a sprocket body and a plurality of sprocket teeth 22a provided to an outer periphery of the sprocket body. The plurality of teeth 22a are circumferentially spaced and extend radially and outwardly from the outer periphery of the sprocket body. A plurality of sprocket attachment portions 22b are circumferentially spaced and extend radially and inwardly from an inner periphery of the sprocket body. The plurality of sprocket attachment portions 22b are configured to be mounted on the sprocket support member 26. The sprocket body has a first axial side or large sprocket side 22c that faces the spoke attachment flange 13c (i.e., an inbound direction toward the small sprocket side 21d of the fourth sprocket 21) and a second axial side or small sprocket side 22d that faces an outbound direction (toward the large sprocket side 23c of the sixth sprocket 23). A plurality of first fastener openings 22e are circumferentially spaced about the sprocket body. Preferably, six first fastener openings 22e are disposed in the sprocket body. A plurality of sprocket mounting portions 22f are circumferentially spaced and extend radially and inwardly from the inner periphery of the sprocket body. A second fastener opening 22g is disposed in each of the sprocket mounting portions 22f. As shown in FIGS. 9 and 11, the fifth sprocket 22 has three sprocket attachment portions 22b and six sprocket mounting portions 22f. Preferably, two sprocket mounting portions 22f are disposed between each adjacent pair of the sprocket attachment portions 22b.

Referring now to FIGS. 3, 5, 6, 9, 10 and 11, the fourth sprocket 21 basically has a sprocket body and a plurality of sprocket teeth 21a provided to an outer periphery of the sprocket body. The plurality of teeth 21a are circumferentially spaced and extend radially and outwardly from the outer periphery of the sprocket body. A plurality of sprocket attachment portions 21b are circumferentially spaced and extend radially and inwardly from an inner periphery of the sprocket body. The plurality of sprocket attachment portions 21b are configured to be mounted on the sprocket support member 26. The sprocket body has a first axial side or large sprocket side 21c that faces the spoke attachment flange 13c (i.e., an inbound direction toward the small sprocket side 20d of the third sprocket 20) and a second axial side or small sprocket side 21d that faces an outbound direction (toward the large sprocket side 22c of the fifth sprocket 22). A plurality of first fastener openings 21e are circumferentially spaced about the sprocket body. Preferably, six first fastener openings 21e are disposed in the sprocket body. A plurality of sprocket mounting portions 21f are circumferentially spaced and extend radially and inwardly from the inner periphery of the sprocket body. A second fastener opening 21g is disposed in each of the sprocket mounting portions 21f. As shown in FIGS. 9 and 11, the fourth sprocket 21 has three sprocket attachment portions 21b and six sprocket mounting portions 21f. Preferably, two sprocket mounting portions 21f are disposed between each adjacent pair of the sprocket attachment portions 21b.

Referring now to FIGS. 3, 5, 6, 9, 10 and 11, the third sprocket 20 basically has a sprocket body and a plurality of sprocket teeth 20a provided to an outer periphery of the sprocket body. The plurality of teeth 20a are circumferentially spaced and extend radially and outwardly from the outer periphery of the sprocket body. A plurality of sprocket attachment portions 20b are circumferentially spaced and extend radially and inwardly from an inner periphery of the sprocket body. The plurality of sprocket attachment portions 20b are configured to be mounted on the sprocket support member 26. The sprocket body has a first axial side or large sprocket side 20c that faces the spoke attachment flange 13c (i.e., an inbound direction toward the small sprocket side 19d of the second sprocket 19) and a second axial side or small sprocket side 20d that faces an outbound direction (toward the large sprocket side 21c of the fourth sprocket 21). A plurality of first fastener openings 20e are circumferentially spaced about the sprocket body. Preferably, three first fastener openings 20e are disposed in the sprocket body. A plurality of sprocket mounting portions 20f are circumferentially spaced and extend radially and inwardly from the inner periphery of the sprocket body. A second fastener opening 20g is disposed in each of the sprocket mounting portions 20f. As shown in FIGS. 9 and 11, the third sprocket 20 has three sprocket attachment portions 20b and six sprocket mounting portions 20f. Preferably, two sprocket mounting portions 20f are disposed between each adjacent pair of the sprocket attachment portions 20b.

Referring now to FIGS. 3, 5, 6, 9, 10 and 11, the second sprocket 19 basically has a sprocket body and a plurality of sprocket teeth 19a provided to an outer periphery of the sprocket body. The plurality of teeth 19a are circumferentially spaced and extend radially and outwardly from the outer periphery of the sprocket body. A plurality of sprocket attachment portions 19b are circumferentially spaced and extend radially and inwardly from an inner periphery of the sprocket body. The plurality of sprocket attachment portions 19b are configured to be mounted on the sprocket support member 26. The sprocket body has a first axial side or large sprocket side 19c that faces the spoke attachment flange 13c (i.e., an inbound direction toward the small sprocket side 18d of the first sprocket 18) and a second axial side or small sprocket side 19d that faces an outbound direction (toward the large sprocket side 20c of the third sprocket 20). A plurality of first fastener openings 19e are circumferentially spaced about the sprocket body. Preferably, six first fastener openings 19e are disposed in the sprocket body. A plurality of sprocket mounting portions 19f are circumferentially spaced and extend radially and inwardly from the inner periphery of the sprocket body. A second fastener opening 19g is disposed in each of the sprocket mounting portions 19f. As shown in FIGS. 9 and 11, the second sprocket 19 has three sprocket attachment portions 19b and three sprocket mounting portions 19f. Preferably, one sprocket mounting portion 19f is disposed between each adjacent pair of the sprocket attachment portions 19b.

Referring now to FIGS. 3, 5 and 9, the first, or largest, sprocket 18 basically has a sprocket body and a plurality of sprocket teeth 18a provided to an outer periphery of the sprocket body. The plurality of teeth 18a are circumferentially spaced and extend radially and outwardly from the outer periphery of the sprocket body. A plurality of sprocket attachment portions 18b are circumferentially spaced and extend radially and inwardly from the inner periphery of the sprocket body. The plurality of sprocket attachment portions 18b are configured to be mounted on the sprocket support member 26. The plurality of sprocket attachment portions 18b are spaced in a circumferential direction about the rotational center axis A. The sprocket body has a first axial side or large sprocket side 18c that faces the spoke attachment flange 13c (i.e., an inbound direction) and a second axial side or small sprocket side 18d that faces an outbound direction (i.e., away from the spoke attachment flange 13c and toward the large sprocket side 19c of the second sprocket 19). A plurality of sprocket mounting portions 18f are circumferentially spaced and extend radially and inwardly from the inner periphery of the sprocket body. A second fastener opening 18g is disposed in each of the sprocket mounting portions 18f. As shown in FIG. 9, the first sprocket 18 has three sprocket attachment portions 18b and six sprocket mounting portions 18f. Preferably, two sprocket mounting portions 18f are disposed between each adjacent pair of sprocket attachment portions 18b. There are no first fastener openings in the sprocket body of the first (i.e., largest) sprocket 18 because a larger sprocket is not attached thereto.

As shown in FIGS. 2, 3 and 7, the bicycle sprocket assembly includes a plurality of reinforcement members 36 attached to at least one of the sprockets 18 to 25. Each reinforcement member 36 extends between adjacent sprockets, as shown in FIGS. 2, 3 and 7. For example, a first reinforcement member 36 is attached to at least one of the first sprocket 18 and the second sprocket 19 and extends between the first sprocket 18 and the second sprocket 19. A second reinforcement member 36 is attached to at least one of the second sprocket 19 and the third sprocket 20 and extends between the second sprocket 19 and the third sprocket 20. A third reinforcement member is attached to at least one of the third sprocket 20 and the fourth sprocket 21 and extends between the third sprocket 20 and the fourth sprocket 21. The first reinforcement member 36 is preferably attached to both of the first sprocket 18 and the second sprocket 19, as shown in FIG. 7. The second reinforcement member 36 is preferably attached to both of the second sprocket 19 and the third sprocket 20. The third reinforcement member 36 is preferably attached to both of the third sprocket 20 and the fourth sprocket 21. The reinforcement members 36 provide rigidity to the rear sprocket assembly 11.

In other words, as shown in FIGS. 2, 3 and 7, the bicycle sprocket assembly includes a plurality of reinforcement members 36 attached to each of the largest sprocket (e.g., sprocket 18), the smallest sprocket (e.g., sprocket 25) and the at least one intermediate sprocket (e.g., sprocket 20) between an adjacent pair of the plurality of sprocket support portions 30 (e.g., between the sprocket support portions 30 located at twelve and eight o'clock).

Preferably, as shown in FIGS. 6 and 7, a plurality of first reinforcement members 36 are attached to at least one of the first sprocket 18 and the second sprocket 19 and extend between the first sprocket 18 and the second sprocket 19. The plurality of first reinforcement members 36 are disposed between a first adjacent pair of the plurality of sprocket support portions (for example, the sprocket support portions 30 located at twelve and eight o'clock). The plurality of first reinforcement members 36 are preferably attached to both of the first sprocket 18 and the second sprocket 19.

As shown in FIGS. 6 and 7, each of the first and second reinforcement members 36 is disposed between an adjacent pair (i.e., a first adjacent pair) of the plurality of sprocket support portions 30. The first and second reinforcement members 36 are disposed between a first adjacent pair of the plurality of sprocket support portions 30, as shown in FIG. 7. Referring to FIG. 8, the first reinforcement member 36 can be disposed between a first adjacent pair of the plurality of sprocket support portions 30 (the sprocket support portions 30 located at twelve and eight o'clock), and the second reinforcement member 36 can be disposed between a second adjacent pair of the plurality of sprocket support portions that is a different pair from the first adjacent pair of the sprocket support portions (the sprocket support portions 30 located at twelve and four o'clock, for example). Referring to FIG. 6, the first reinforcement member 36 attached to at least one of the first sprocket 18 and the second sprocket 19 and the second reinforcement member 36 attached to at least one of the second sprocket 19 and the third sprocket 20 are radially offset. In other words, the first and second reinforcement members 36 do not lie on the same radial line extending radially from the rotational center axis A.

Referring to FIG. 6, at least one second reinforcement member 36 is attached to the second sprocket 19 and the third sprocket 20 between a second pair of the plurality of sprocket support portions 30. The plurality of first reinforcement members 36 are disposed between a first adjacent pair of sprocket support portions 30 (e.g., between the eight o'clock and the twelve o'clock sprocket support portions). The at least one second reinforcement member 36 is disposed between a second adjacent pair of sprocket support portions 30 (e.g., between the twelve o'clock and the four o'clock sprocket support portions) different from the first adjacent pair of sprocket support portions.

Referring to FIG. 6, each of the first reinforcement members 36 (attached to at least one of the first sprocket 18 and the second sprocket 19) and the third reinforcement members 36 (attached to at least one of the third sprocket 20 and the fourth sprocket 21) are disposed between an adjacent pair of the plurality of sprocket support portions 30. The first and third reinforcement members 36 are disposed between a first adjacent pair of the plurality of sprocket support portions 30 (e.g., between the sprocket support portions 30 located at eight and twelve o'clock). Alternatively, the first reinforcement members 36 are disposed between a first adjacent pair of the plurality of sprocket support portions 30 (e.g., between the sprocket support portions 30 located at eight and twelve o'clock), and the third reinforcement member 36 is disposed between a third adjacent pair of the plurality of sprocket support portions 30 (e.g., between the sprocket support portions 30 located at four and eight o'clock) that is a different pair from the first adjacent pair of the sprocket support portions. Referring to FIGS. 6 and 7, the first reinforcement member 36 attached to at least one of the first sprocket 18 and the second sprocket 19 and the third reinforcement member 36 attached to at least one of the third sprocket 20 and the fourth sprocket 21 are radially offset. In other words, the first and third reinforcement members 36 do not lie on the same radial line extending radially from the rotational center axis A.

Referring to FIG. 6, the first adjacent pair of the plurality of sprocket support portions 30 and the plurality of first reinforcement members 36 are positioned at equal intervals in the circumferential direction. Accordingly, a circumferential distance between a sprocket support portion 30 and a first reinforcement member 36 is the same as the circumferential distance between that first reinforcement member 36 and the adjacent reinforcement member 36, which is the same circumferential distance between the adjacent reinforcement member 36 and the other sprocket support portion 30 of the first adjacent pair of the plurality of sprocket support portions 30.

The at least one second reinforcement member can include a plurality of reinforcement members 36, such as between the third sprocket 20 and the fourth sprocket 21, disposed between the second adjacent pair of the plurality of sprocket support portions 30, as shown in FIG. 6. The at least one second reinforcement member 36 includes a plurality of second reinforcement members (such as between the third sprocket 20 and the fourth sprocket 21), and the number of the first reinforcement members 36 (such as between the second sprocket 19 and the third sprocket 20) is less than the number of the plurality of second reinforcement members.

The at least one second reinforcement member can include a plurality of reinforcement members 36, such as between the seventh sprocket 24 and the eighth sprocket 25, disposed between the second adjacent pair of the plurality of sprocket support portions 30, as shown in FIG. 6. The at least one second reinforcement member 36 includes a plurality of second reinforcement members (such as between the seventh sprocket 24 and the eighth sprocket 25), and the number of the plurality of first reinforcement members 36 (such as between the sixth sprocket 23 and the seventh sprocket 24) is less than the number of the plurality of second reinforcement members.

The first reinforcement member 36 includes a first mounting portion integrally formed as a one-piece member with one of the first sprocket 18 and the second sprocket 19. The second reinforcement member 36 includes a second mounting portion integrally formed as a one-piece member with one of the second sprocket 19 and the third sprocket 20. The third reinforcement member 36 includes a third mounting portion integrally formed as a one-piece member with one of the third sprocket 20 and the fourth sprocket 21. Referring to FIGS. 6 and 7, the first reinforcement member 36 includes a first sprocket mounting portion 18*f* integrally formed as a one-piece member with the first sprocket 18. The second reinforcement member 36 includes a second mounting portion 19*f* integrally formed as one-piece member with the second sprocket 19. The third reinforcement member 36 includes a third mounting portion 20*f* integrally formed as a one-piece member with the third sprocket 20.

In other words, each of the plurality of reinforcement members attached to a larger sprocket including the largest sprocket and the at least one intermediate sprocket and to a smaller sprocket including the smallest sprocket and the at least one intermediate sprocket includes a mounting portion integrally formed as a one-piece member with one of the larger sprocket and the smaller sprocket to which each of the plurality of reinforcement members is respectively attached. As shown in FIG. 7, the reinforcement member 36 attached to the larger sprocket of an adjacent pair of sprockets, such as sprockets 18 and 19, includes a mounting portion 18*f* integrally formed as a one-piece member with the larger sprocket (i.e., sprocket 18). The reinforcement member 36 attached to sprockets 24 and 25 includes a mounting portion 24*f* integrally formed as a one-piece member with the larger sprocket, i.e., sprocket 24.

Preferably, each reinforcement member 36 includes a reinforcement member body 36*a* extending between adjacent sprockets. The reinforcement member body 36*a* has a first end portion 36*b* and a second end portion 36*c* disposed at opposite ends thereof, and integrally formed therewith as a one-piece member. Diameters of the first and second end portions 36*b* and 36*c* are smaller than a diameter of the reinforcement member body 36*a*. The first end portion 36*b* of the reinforcement member body 36*a* extends into a first fastener opening disposed in the body of the smaller sprocket of the adjacent sprockets. The second end portion 36c of the reinforcement member body 36a extends into a second fastener opening disposed in the sprocket mounting portion of the larger sprocket of the adjacent sprockets. Referring to FIG. 10, the second end portion 36c of the reinforcement member body 36a extends into the first fastener opening 25e in the eighth sprocket 25. The first end portion 36b of the reinforcement member body 36a extends into the second fastener opening 24g disposed in the sprocket mounting portion 24f of the seventh sprocket 24. Referring to FIGS. 3 and 7, the first and second end portions 36 are received by the adjacent sprockets such that opposite ends of the reinforcement member body 36a abut the respective sprockets. Reinforcement members are similarly attached between each pair of adjacent sprockets of the sprocket assembly 11. The reinforcement member body 36a is made of any suitable material, such as, but not limited to, metal, plastic or a composite resin. Although the reinforcement members 36 are illustrated as being a separate member from the sprockets, the reinforcement member can be unitarily formed as a one-piece member with one of the larger or smaller sprocket between which the reinforcement members extend.

As shown in FIG. 6, at least one reinforcement member 36 is attached to at least one sprocket of at least one adjacent pair of sprockets between which the reinforcement member extends. Preferably, a plurality of reinforcement members 36 are attached to at least one sprocket of each adjacent pair of sprockets between which the reinforcement members extend. The number of reinforcement members between one adjacent pair of sprockets can be different from the number of reinforcement members between a different adjacent pair of sprockets. A number of plurality of first reinforcement members 36 (attached to at least one of the first sprocket 18 and the second sprocket 19) is different from a number of the at least one second reinforcement members 36 (attached to at least one of the second sprocket 19 and the third sprocket 20). The exemplary embodiment illustrated in FIG. 6, for example, includes six first reinforcement members and three second reinforcement members. The number of the plurality of first reinforcement members 36 is greater than a number of the at least one second reinforcement members 36. Any suitable number of reinforcement members can be disposed between adjacent sprockets. For example, as illustrated in FIG. 6, six reinforcement members 36 are disposed between the first sprocket 18 and the second sprocket 19, three reinforcement members 36 are disposed between the second sprocket 19 and the third sprocket 20, six reinforcement members 36 are disposed between the third sprocket 20 and the fourth sprocket 21, six reinforcement members 36 are disposed between the fourth sprocket 21 and the fifth sprocket 22, six reinforcement members 36 are disposed between the fifth sprocket 22 and the sixth sprocket 23, six reinforcement members 36 are disposed between the sixth sprocket 23 and the seventh sprocket 24, and twelve reinforcement members 36 are disposed between the seventh sprocket 24 and the eighth sprocket 25.

As shown in FIG. 6, the number of the first reinforcement members 36 disposed between a first adjacent pair of the plurality of sprocket support portions 30, such as the reinforcement members 36 disposed between sprockets 18 and 19 disposed between the sprocket support portions 30 located at eight and twelve o'clock, is different from the number of the second reinforcement members disposed between a second adjacent pair of the plurality of sprocket support portions, such as the reinforcement members 36 disposed between sprockets 19 and 20 disposed between the sprocket support portions 30 located at twelve and four o'clock. For example, two of the first reinforcement members 36 are disposed between the first adjacent pair of the plurality of sprocket support portions 30 located at eight and twelve o'clock, and one of the second reinforcement members 36 is disposed between the second adjacent pair of the plurality of sprocket support portions 30 located at twelve and four o'clock. As shown in FIG. 6, the number of the first reinforcement members 36 disposed between a first adjacent pair of the plurality of support portions 30, such as the support portions 30 located at eight and twelve o'clock, is different from the number of the second reinforcement members disposed between the first adjacent pair of the sprocket support portions 30. For example, two of the first reinforcement members 36 disposed between the first sprocket 18 and the second sprocket 19 between the sprocket support portions 30 located at eight and twelve o'clock and one of the second reinforcement members 36 disposed between the second sprocket 19 and the third sprocket 20 between the sprocket support portions 30 located at eight and twelve o'clock.

As shown in FIGS. 10 and 11, the sprockets 18 to 25 are assembled prior to being mounted on the sprocket support member 26. The sprockets can be assembled in any order, starting with the largest sprocket and ending with the smallest sprocket as shown in FIGS. 10 and 11, or starting with the smallest sprocket and ending with the largest sprocket.

Referring to FIG. 8, a cutout 30e is formed in each of the axially extending surfaces 30b of the sprocket support portions 30. The cutout 30e can have any suitable shape, such as the substantially flat bottom V-shape illustrated in FIG. 8. The cutout 30e extends from one radially extending surface to the adjacent radially extending surface in the axial direction. Each cutout 30e is configured to receive an insert (not shown) to facilitate spacing adjacent sprockets and rigidly securing the sprockets to the sprocket support member 26. The inserts (not shown) are configured to be disposed between adjacent sprockets, thereby properly spacing adjacent sprockets.

As shown in FIGS. 3, 6 and 7, each of the sprockets 18 to 25 is mounted on the sprocket support portions 30 of the sprocket support member 26. As shown in FIGS. 8 and 9, the sprocket support member 26 has three sprocket support portions 30 and each of the sprockets 18 to 25 has three sprocket attachment portions 18b to 25b. Each of the sprocket attachment portions 18b to 25b is received by a corresponding cutout 30e in the axially extending surfaces 30b of the sprocket support portions 30. The first sprocket 18 is disposed on the sprocket support member 30 such that the sprocket attachment portions 18b are received by the cutouts 30e in the axially extending surfaces 30b of the sprocket support portions 30 of the sprocket support member 26. The first axial side 18c of the first sprocket 18 abuts the radially extending surfaces 30a of the sprocket support portions 30. The second axial side 18d of the sprocket 18 abuts a first side of an insert (not shown) disposed in the cutout 30e. Adhesive is disposed between the second axial sides (contacting sides) 18d of the sprocket 18 and the first sides of the insert, respectively, to facilitate rigidly securing the sprocket 18 to the sprocket supporting member 26. Alternative or additional means of securing the sprocket 18 to the sprocket support member 26 can be used, such as diffusion bonding or rivets.

The second sprocket 19 is disposed on the sprocket support member 26 such that the sprocket attachment portions 19b are received by the cutouts 30e in the axially extending surfaces 30b of the sprocket support portions 30.

A first axial side 19c of the second sprocket 19 abuts the radially extending surfaces 30a of the sprocket support portions and the second sides of the inserts (not shown). The second axial side 19d of the second sprocket 19 abuts a first side of another insert (not shown). Adhesive is disposed between the first axial side 19c and the second axial side 19d (contacting sides) of the second sprocket 19 and the two inserts (not shown), respectively, to facilitate rigidly securing the second sprocket 19 to the sprocket supporting member 26. Alternative or additional means of securing the second sprocket 19 to the sprocket support member 26 can be used, such as diffusion bonding or rivets.

The remaining sprockets 20 to 25 are similarly mounted to the sprocket support member 26 such that the mounting thereof is not described herein.

A mounting ring 34 has an annular shape and a plurality of mounting ring mounting portions 34a provided to an inner periphery thereof, as shown in FIGS. 8 and 9. The plurality of mounting ring mounting portions 34a are circumferentially spaced and extend radially and inwardly from the inner periphery of the mounting ring. Preferably, the mounting ring 34 has three mounting ring mounting portions 34a. As shown in FIG. 3, the mounting ring 34 is disposed on the second axial side 25d of the eighth sprocket 25. The mounting portions 34a are received by the cutouts 30e in the axially extending surfaces 30b of the sprocket support portions 30. The mounting ring 34 can be secured to the sprocket support member 26 in any suitable manner, such as with an adhesive.

Referring to FIG. 3, the sprocket support member 26 is connected to the bicycle rear hub assembly 10 such that the hub engagement profile 28a formed on the radially inner peripheral surface 30a of the central cylindrical portion 28 engages the splined portion 16a of the sprocket support body 16 of the rear hub assembly 10. A spacer (not shown) and a lock ring (not shown) can be disposed on the sprocket support body 16. The lock ring secures the bicycle rear sprocket assembly 11 to the bicycle rear hub assembly 10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle sprocket assembly. Accordingly, these directional terms, as utilized to describe the bicycle rear sprocket assembly should be interpreted relative to a bicycle in an upright riding position on a horizontal surface and that is equipped with the bicycle rear sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A bicycle sprocket assembly comprising:
a first sprocket;
a second sprocket that is a separate member from the first sprocket;
a third sprocket that is a separate member from the first sprocket and the second sprocket;
a sprocket support member configured to support at least one of the first sprocket, the second sprocket and the third sprocket, the sprocket support member including
a central cylindrical portion, and
a plurality of sprocket support portions extending radially outwardly from the central cylindrical portion with respect to a rotational center axis of the bicycle sprocket assembly, the plurality of sprocket support portions being spaced apart from each other in a circumferential direction about the rotational center axis;

a plurality of first reinforcement members attached to at least one of the first sprocket and the second sprocket and extending between the first sprocket and the second sprocket, each of the plurality of first reinforcement members being disposed between [a same adjacent pair of the plurality of sprocket support portions; and a second reinforcement member attached to at least one of the second sprocket and the third sprocket and extending between the second sprocket and the third sprocket, the second reinforcement member being disposed between an adjacent pair of the plurality of sprocket support portions.

2. The bicycle sprocket assembly according to claim 1, wherein
each of the plurality of first reinforcement members is attached to both of the first sprocket and the second sprocket.

3. The bicycle sprocket assembly according to claim 2, wherein
the second reinforcement member is attached to both of the second sprocket and the third sprocket.

4. The bicycle sprocket assembly according to claim 1, wherein
the first and second reinforcement members are disposed between a first adjacent pair of the plurality of sprocket support portions.

5. The bicycle sprocket assembly according to claim 1, wherein
the plurality of first reinforcement members are disposed between a first adjacent pair of the plurality of sprocket support portions, and the second reinforcement member is disposed between a second adjacent pair of the plurality of sprocket support portions that is a different pair from the first adjacent pair of the sprocket support portions.

6. The bicycle sprocket assembly according to claim 1, wherein
the sprocket support member is configured to support the first sprocket, the second sprocket and the third sprocket.

7. The bicycle sprocket assembly according to claim 1, wherein
each of the plurality of sprocket support portions include
a plurality of radially extending surfaces extending radially relative to the rotational center axis to support at least the first sprocket, the second sprocket and the third sprocket; and
a plurality of axially extending surfaces extending in an axial direction parallel to the rotational center axis.

8. The bicycle sprocket assembly according to claim 7, wherein
the plurality of radially extending surfaces and the plurality of axially extending surfaces form a stepped shape.

9. The bicycle sprocket assembly according to claim 1, wherein
the central cylindrical portion includes a hub engagement profile to engage a bicycle hub assembly.

10. The bicycle sprocket assembly according to claim 1, wherein
each of the plurality of first reinforcement members includes a first mounting portion integrally formed as a one-piece member with one of the first sprocket and the second sprocket, and the second reinforcement member includes a second mounting portion integrally formed as a one-piece member with one of the second sprocket and the third sprocket.

11. The bicycle sprocket assembly according to claim 1, wherein
the first and second reinforcement members are radially offset.

12. The bicycle sprocket assembly according to claim 11, wherein
the second reinforcement member includes a plurality of second reinforcement members and the number of the plurality of first reinforcement members is less than the number of the plurality of second reinforcement members.

13. The bicycle sprocket assembly according to claim 1, wherein
an equal number of the first reinforcement members are disposed between each adjacent pair of the plurality of sprocket support portions, and an equal number of the second reinforcement members are disposed between each adjacent pair of the plurality of sprocket support portions.

14. A bicycle sprocket assembly comprising:
a first sprocket;
a second sprocket that is a separate member from the first sprocket;
a sprocket support member configured to support the first sprocket and the second sprocket, the sprocket support member including
a central cylindrical portion; and
a plurality of sprocket support portions extending radially outwardly from the central cylindrical portion with respect to a rotational center axis of the bicycle sprocket assembly, the plurality of sprocket support portions being spaced apart from each other in a circumferential direction about the rotational center axis; and
a plurality of first reinforcement members attached to at least one of the first sprocket and the second sprocket and extending between the first sprocket and the second sprocket, the plurality of first reinforcement members being disposed between a first adjacent pair of the plurality of sprocket support portions.

15. The bicycle sprocket assembly according to claim 14, wherein
the plurality of first reinforcement members are attached to both of the first sprocket and the second sprocket.

16. The bicycle sprocket assembly according to claim 14, wherein
the first adjacent pair of the plurality of sprocket support portions and the plurality of first reinforcement members are positioned at equal intervals in the circumferential direction.

17. The bicycle sprocket assembly according to claim 14, further comprising
a third sprocket that is a separate member from the first sprocket and the second sprocket, the first sprocket being larger than the second sprocket and the second sprocket being larger than the third sprocket;
at least one second reinforcement member attached to the second sprocket and the third sprocket between a second adjacent pair of the plurality of sprocket support portions.

18. The bicycle sprocket assembly according to claim 17, wherein
the at least one second reinforcement member includes a plurality of second reinforcement members.

19. The bicycle sprocket assembly according to claim 17, wherein a number of the plurality of first reinforcement members is different from a number of the at least one second reinforcement members.

20. The bicycle sprocket assembly according to claim 19, wherein
the number of the plurality of first reinforcement members is greater than the number of the at least one second reinforcement member.

21. The bicycle sprocket assembly according to claim 19, wherein
the at least one second reinforcement member includes a plurality of second reinforcement members and the number of the plurality of first reinforcement members is less than the number of the plurality of second reinforcement members.

22. The bicycle sprocket assembly according to claim 17, wherein
the first reinforcement member includes a first mounting portion integrally formed as a one-piece member with one of the first sprocket and the second sprocket, and the second reinforcement member includes a second mounting portion integrally formed as a one-piece member with one of the second sprocket and the third sprocket.

23. The bicycle sprocket assembly according to claim 17, wherein
the plurality of first reinforcement members and the at least one second reinforcement member are radially offset.

24. The bicycle sprocket assembly according to claim 14, wherein
an equal number of the first reinforcement members are disposed between each adjacent pair of the plurality of sprocket support portions, and an equal number of the second reinforcement members are disposed between each adjacent pair of the plurality of sprocket support portions.

25. A bicycle sprocket assembly comprising:
a first sprocket;
a second sprocket that is a separate member from the first sprocket;
a third sprocket that is a separate member from the first sprocket and the second sprocket;
a fourth sprocket that is a separate member from the first sprocket, the second sprocket and the third sprocket;
a sprocket support member configured to support at least one of the first sprocket, the second sprocket, the third sprocket and the fourth sprocket, the sprocket support member including
a central cylindrical portion; and
a plurality of sprocket support portions extending radially outwardly from the central cylindrical portion with respect to a rotational center axis of the bicycle sprocket assembly, the plurality of sprocket support portions being spaced apart from each other in a circumferential direction about the rotational center axis;
a plurality of first reinforcement members attached to at least one of the first sprocket and the second sprocket and extending between the first sprocket and the second sprocket, each of the plurality of first reinforcement members being disposed between a same adjacent pair of the plurality of sprocket support portions; and
a third reinforcement member attached to at least one of the third sprocket and the fourth sprocket and extending between the third sprocket and the fourth sprocket, the third reinforcement member being disposed between an adjacent pair of the plurality of sprocket support portions.

26. The bicycle sprocket assembly according to claim 25, wherein
each of the plurality of first reinforcement members is attached to both of the first sprocket and the second sprocket.

27. The bicycle sprocket assembly according to claim 26, wherein
the third reinforcement member is attached to both of the third sprocket and the fourth sprocket.

28. The bicycle sprocket assembly according to claim 25, wherein
the first and third reinforcement members are disposed between a first adjacent pair of the plurality of sprocket support portions.

29. The bicycle sprocket assembly according to claim 25, wherein
each of the plurality of first reinforcement members is disposed between a first adjacent pair of the plurality of sprocket support portions, and the third reinforcement member is disposed between a third adjacent pair of the plurality of sprocket support portions that is a different pair from the first adjacent pair of the sprocket support portions.

30. The bicycle sprocket assembly according to claim 25, wherein
the first sprocket is larger than the second sprocket, the second sprocket is larger than the third sprocket and the third sprocket is larger than the fourth sprocket.

31. The bicycle sprocket assembly according to claim 25, wherein
each of the plurality of first reinforcement members includes a first mounting portion integrally formed as a one-piece member with one of the first sprocket and the second sprocket, and the third reinforcement member includes a third mounting portion integrally formed as a one-piece member with one of the third sprocket and the fourth sprocket.

32. The bicycle sprocket assembly according to claim 25, wherein
the first and third reinforcement members are radially offset.

33. The bicycle sprocket assembly according to claim 25, wherein
an equal number of the first reinforcement members are disposed between each adjacent pair of the plurality of sprocket support portions, and an equal number of the second reinforcement members are disposed between each adjacent pair of the plurality of sprocket support portions.

34. A bicycle sprocket assembly comprising:
a largest sprocket;
a smallest sprocket;
at least one intermediate sprocket disposed between the largest sprocket and the smallest sprocket in an axial direction parallel to a rotational center axis of the bicycle sprocket assembly;
a sprocket support member configured to support at least one of the largest sprocket, the smallest sprocket and the at least one intermediate sprocket, the sprocket support member including
a central cylindrical portion; and
a plurality of sprocket support portions extending radially outwardly from the central cylindrical portion with respect to the rotational center axis, the plurality of sprocket support portions being spaced apart from each other in a circumferential direction about the rotational center axis;

a plurality of reinforcement members attached to each of the largest sprocket, the smallest sprocket and the at least one intermediate sprocket between an adjacent pair of the plurality of sprocket support portions, the number of the plurality of reinforcement members attached to the largest sprocket being fewer than the number of the plurality of reinforcement members attached to the smallest sprocket.

35. The bicycle sprocket assembly according to claim 34, wherein the at least one intermediate sprocket includes a plurality of intermediate sprockets.

36. The bicycle sprocket assembly according to claim 34, wherein each of the plurality of reinforcement members attached to a larger sprocket including the largest sprocket and the at least one intermediate sprocket and to a smaller sprocket including the smallest sprocket and the at least one intermediate sprocket includes a mounting portion integrally formed as a one-piece member with one of the larger sprocket and the smaller sprocket to which each of the plurality of reinforcement members is respectively attached.

* * * * *